(12) United States Patent
Santo et al.

(10) Patent No.: US 7,859,584 B2
(45) Date of Patent: Dec. 28, 2010

(54) CAMERA SYSTEM

(75) Inventors: Takeo Santo, Osaka (JP); Naoto Yumiki, Osaka (JP); Kenichi Honjo, Osaka (JP)

(73) Assignee: Panasonic Corporation, Osaka (JP)

( * ) Notice: Subject to any disclaimer, the term of this patent is extended or adjusted under 35 U.S.C. 154(b) by 436 days.

(21) Appl. No.: 12/127,401

(22) Filed: May 27, 2008

(65) Prior Publication Data

US 2008/0297625 A1 Dec. 4, 2008

(30) Foreign Application Priority Data

May 28, 2007 (JP) ............................. 2007-140954

(51) Int. Cl.
*H04N 5/262* (2006.01)
*H04N 5/222* (2006.01)
*H04N 5/232* (2006.01)

(52) U.S. Cl. ................... 348/333.05; 348/239; 348/346

(58) Field of Classification Search ............. 348/218.1, 348/239, 333.05, 346; 396/374
See application file for complete search history.

(56) References Cited

U.S. PATENT DOCUMENTS

| | | | | |
|---|---|---|---|---|
| 5,172,234 A * | 12/1992 | Arita et al. | ............... | 348/240.2 |
| 5,557,358 A * | 9/1996 | Mukai et al. | ................. | 396/296 |
| 7,050,622 B2 * | 5/2006 | Morishima et al. | .......... | 382/148 |
| 7,643,738 B2 * | 1/2010 | Yumiki | ......................... | 396/55 |
| 7,683,959 B2 * | 3/2010 | Moon et al. | ............. | 348/333.05 |
| 2007/0212039 A1 * | 9/2007 | Yumiki | ......................... | 396/55 |
| 2007/0291154 A1 * | 12/2007 | Moon et al. | ............. | 348/333.05 |
| 2008/0055454 A1 * | 3/2008 | Yumiki | ................... | 348/333.12 |
| 2008/0273110 A1 * | 11/2008 | Joza et al. | .............. | 348/333.05 |
| 2008/0297639 A1 * | 12/2008 | Honjo et al. | ........... | 348/333.05 |
| 2008/0297640 A1 * | 12/2008 | Honjo et al. | ........... | 348/333.05 |
| 2008/0303936 A1 * | 12/2008 | Muramatsu et al. | ......... | 348/335 |
| 2009/0128640 A1 * | 5/2009 | Yumiki | .................... | 348/208.6 |
| 2009/0268075 A1 * | 10/2009 | Yumiki | .................. | 348/333.05 |

FOREIGN PATENT DOCUMENTS

| | | |
|---|---|---|
| JP | 6006807 | 1/1994 |
| JP | 2000295634 | 10/2000 |
| JP | 2001-125173 | 5/2001 |

\* cited by examiner

*Primary Examiner*—David L Ometz
*Assistant Examiner*—Dillon Durnford-Geszvain
(74) *Attorney, Agent, or Firm*—Pearne & Gordon LLP

(57) ABSTRACT

A camera system 100 has an imaging optical system L, an imaging component 45, a liquid crystal monitor 16, and an image display controller 15. The liquid crystal monitor 16 allows a plurality of images acquired by the imaging component 45 to be displayed. The image display controller 15 controls the display component to display an image A1, which is part of the image acquired by the imaging component 45, as a reference image A on the liquid crystal monitor 16, and to display part of the image acquired by the imaging component 45 at a different timing from that of the image A1 as a comparative image B on the liquid crystal monitor 16. The image display controller 15 controls the display component to display the image A1 as a reference image A in a state of being inverted around a symmetry axis 51a.

20 Claims, 15 Drawing Sheets

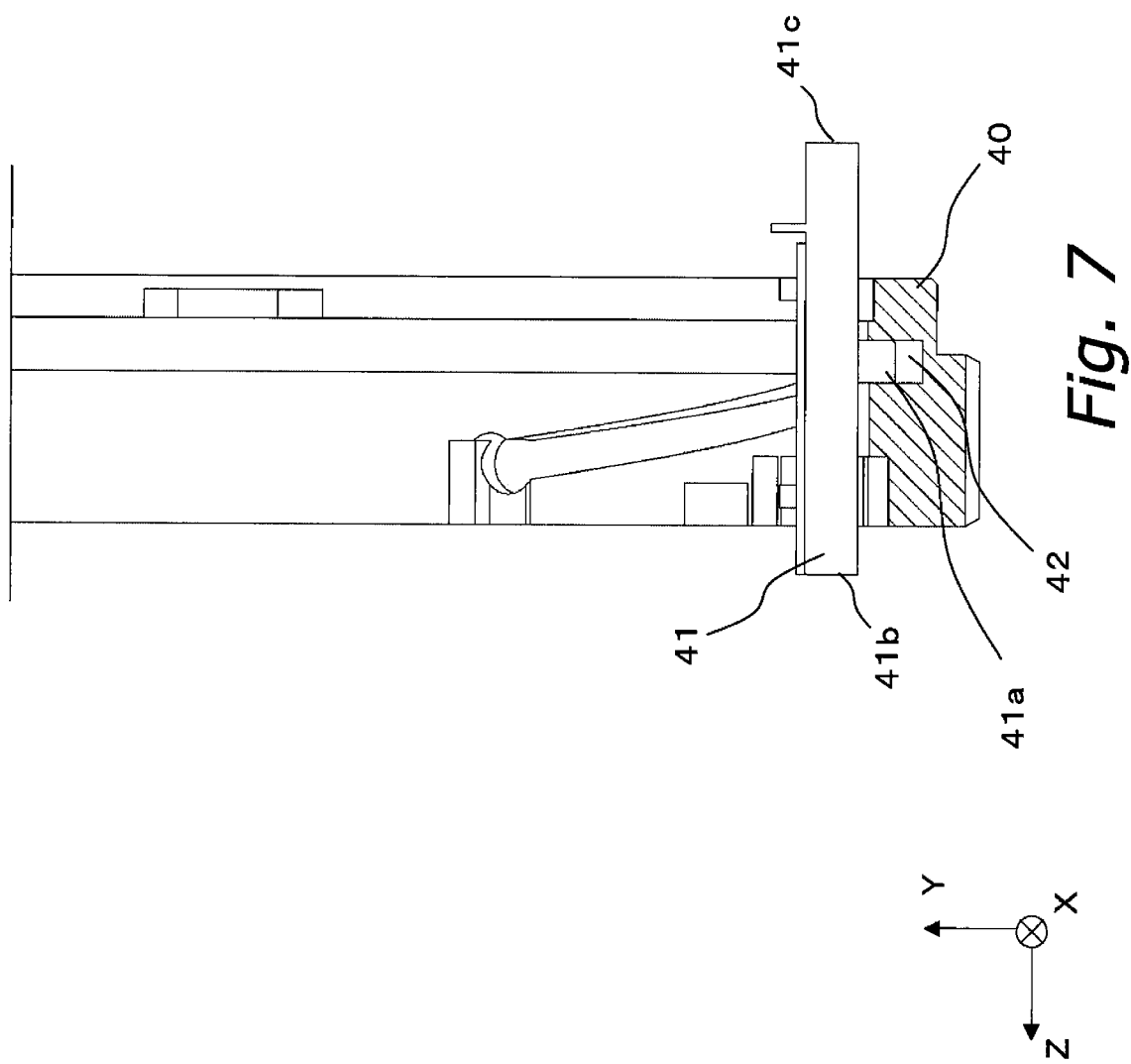

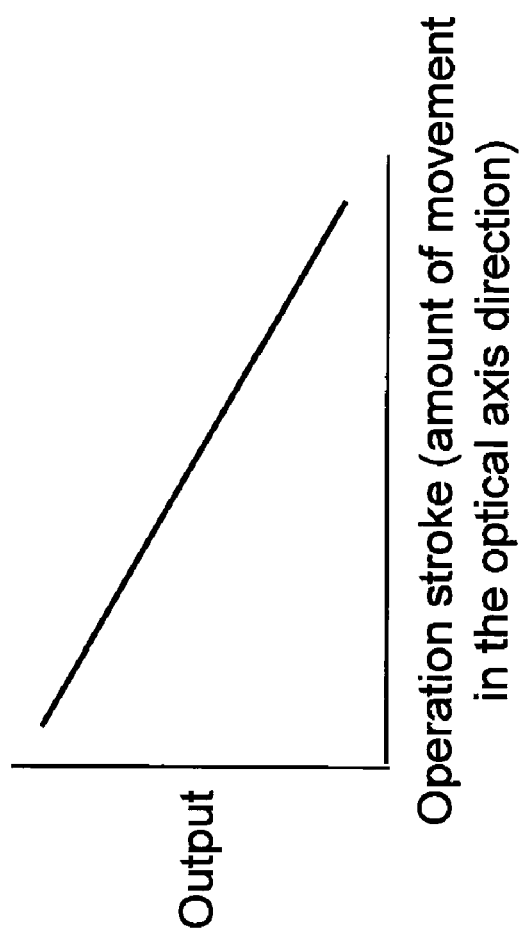

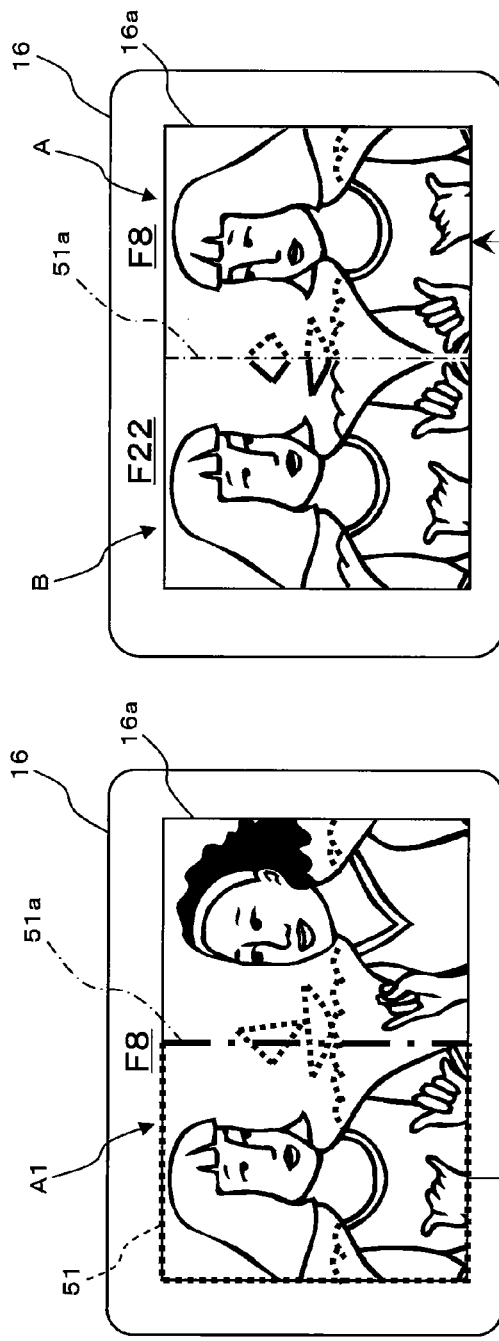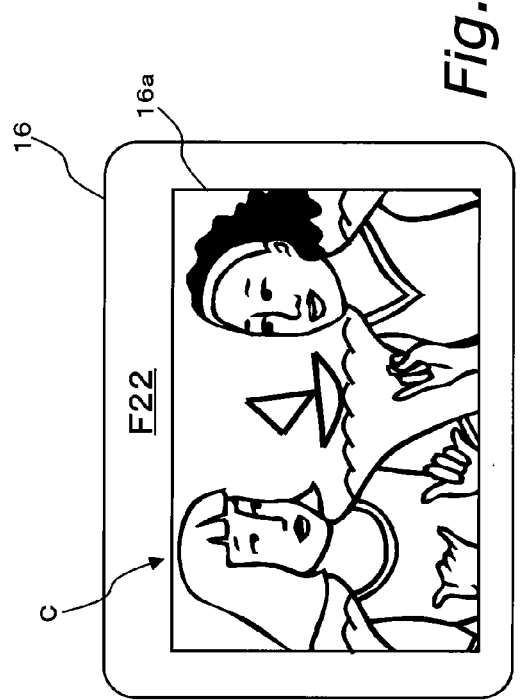
Fig. 13A
Fig. 13B
Fig. 13C

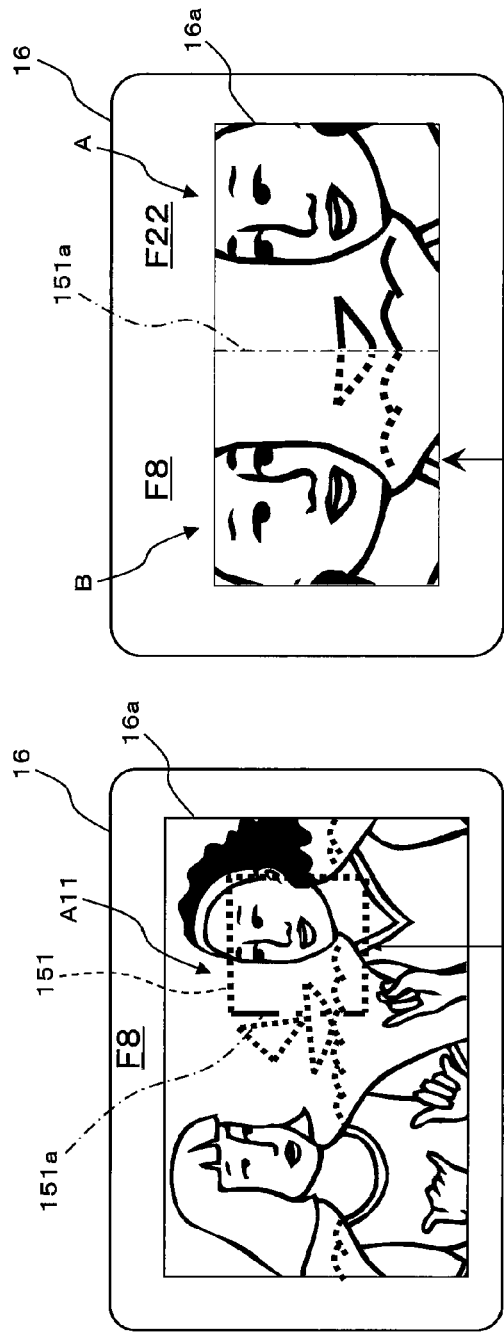
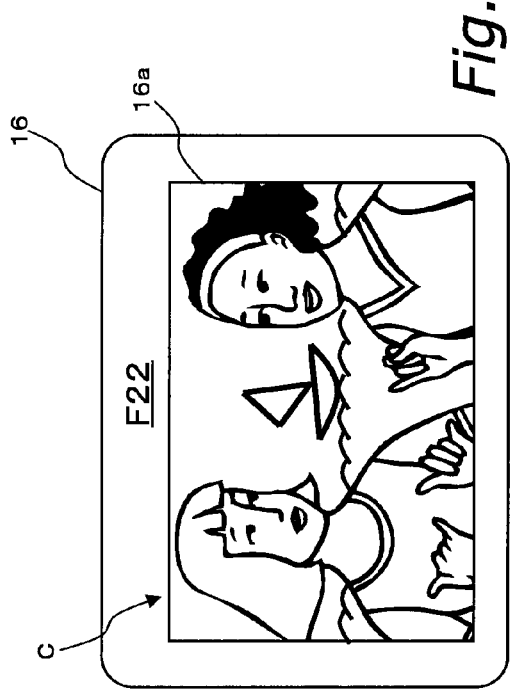
Fig. 15A
Fig. 15B
Fig. 15C

CAMERA SYSTEM

CROSS-REFERENCE TO RELATED APPLICATIONS

This application claims priority to Japanese Patent Application No. JP2007-140954 filed on May 28, 2007. The entire disclosure of Japanese Patent Application No. JP2007-140954 is hereby incorporated herein by reference.

BACKGROUND OF THE INVENTION

1. Field of the Invention

The present invention relates to a camera system, and more particularly to a camera system with which a plurality of images can be displayed side by side.

2. Background Information

Single-lens reflex digital cameras have become tremendously popular in recent years. With a single-lens reflex digital camera, when an optical viewfinder is used to view a subject, the light incident on the imaging optical system is reflected by a reflecting mirror disposed along the optical path, and is guided to the viewfinder optical system. As a result, the subject image is converted by a pentaprism or the like into an erect image before being guided to the viewfinder optical system. This allows the user to view the subject image formed by the imaging optical system through the optical viewfinder. Thus, the reflecting mirror is usually disposed along the optical path.

Meanwhile, when an optical image of the subject is converted into an image signal, the reflecting mirror is retracted from the optical path so that the light from the imaging optical system will be incident on an imaging element. As a result, opto-electric conversion is performed by the imaging element, and image data about the subject is obtained. When imaging is complete, the reflecting mirror is returned to its home position along the optical path. With a single-lens reflex camera, this operation of the reflecting mirror is the same regardless of whether the camera is a conventional silver halide camera or a digital camera.

However, when the home position of the reflecting mirror lies in the optical path, the light from the imaging optical system is not incident on the imaging element. Therefore, in the case of a digital camera, with the above-mentioned system, a monitor photography mode, in which the user uses the liquid crystal monitor to view the subject, cannot be achieved, and a camera system such as this is inconvenient for a beginner unaccustomed to photography.

In view of this, as discussed in Japanese Laid-Open Patent Application 2001-125173, a single-lens reflex digital camera has been proposed with which a liquid crystal monitor can be used during image capture. With this camera system, in monitor photography mode, the reflecting mirror is retracted from the optical path and the light from the imaging optical system is incident on the imaging element. This allows the subject to be viewed on the liquid crystal monitor.

Also, the imaging element of a single-lens reflex digital camera is generally larger in size than the imaging element of an ordinary compact digital camera. Therefore, when an optical image of the subject is formed on the imaging element, a smaller area is in focus, and the subject field depth tends to be shallow. Therefore, with a single-lens reflex digital camera, it is important to adjust the aperture and confirm the subject field depth.

In view of this, as discussed in Japanese Laid-Open Patent Application H6-6807, a camera system has been proposed with which a plurality of images captured under different photography conditions, for example, can be displayed side by side.

With a conventional camera system, however, a plurality of images with different photography conditions, or parts thereof, are merely displayed side by side. This means that the portions to be compared are far apart, making it less convenient to compare images.

SUMMARY OF THE INVENTION

The present invention provides a camera system which is designed and configured to improve convenience for the user by allowing a plurality of images to be displayed side by side.

According to an aspect the present invention, a camera system includes an imaging optical system, an imaging component, a display component, and a display control component. The imaging optical system forms an optical image of a subject. The imaging component converts the optical image into an image signal and acquires an image of the subject. The display component allows a plurality of the images acquired by the imaging component to be displayed side by side. The display control component controls the display component to display as a reference image at least part of a first image acquired by the imaging component and to display as a comparative image at least part of a second image acquired by the imaging component at a different timing from the first image. The display control component controls the display component to display either at least part of the first image or at least part of the second image as either the reference image or the comparative image in a state of being inverted around a specific symmetry axis.

With this camera system, either the reference image or the comparative image is displayed in an inverted state. Therefore, two images acquired at different timing can be displayed side by side, one not in an inverted state and the other in an inverted state. As a result, the corresponding portions out of the two images captured under different photography conditions can be compared in a substantially adjacent state, which improves convenience in the comparison of images.

According to another aspect of the present invention, the display control component of the camera system determines at least part of the first image and at least part of the second image on the basis of an imaginary reference frame in a display region of the display component.

According to yet another aspect of the present invention, the symmetry axis of the camera system is part of the reference frame.

According to still another aspect of the present invention, the reference image and the comparative image of the camera system are displayed side by side with the symmetry axis in between.

The phrase "side by side with the symmetry axis in between" as used here includes a state in which the reference image and comparative image are touching with the symmetry axis in between, as well as a state in which the reference image and comparative image are separated with the symmetry axis in between.

According to a further aspect of the present invention, the symmetry axis of the camera system matches a boundary line between the reference image and the comparative image.

According to another aspect of the invention, the display control component of the camera system determines a layout of the reference image and the comparative image on the display component on the basis of the symmetry axis.

According to yet a further aspect of the present invention, the camera system further includes a control that allows information to be inputted from the outside. When range information related to either the range of the reference image in the first image or the range of the comparative image in the second image is inputted with the control, the display control component controls the display component to display the reference image and the comparative image on the basis of the range information.

According to another aspect of the present invention, when symmetry axis information related to the position of the symmetry axis in either the reference image or the comparative image is inputted to the control, the display control component performs inverted display on the display component on the basis of the symmetry axis information.

According to still another aspect of the present invention, the camera system further includes a boundary detector. The boundary detector detects a boundary between a focused region and an unfocused region in the first and/or second image. The display control component controls the display component to display a boundary periphery detected by the boundary detector as the reference image and comparative image.

These and other features, aspects and advantages of the present invention will become apparent to those skilled in the art from the following detailed description, which, taken in conjunction with the annexed drawings, discloses a preferred embodiment of the present invention.

BRIEF DESCRIPTION OF DRAWINGS

Referring now to the attached drawings which form a part of this original disclosure:

FIG. 7 is a partial cross section showing the linkage of an aperture linear sensor and the aperture ring pertaining to the first embodiment of the present invention;

FIG. 8A is a circuit diagram of the aperture linear sensor of a lens barrel in the first embodiment of the present invention;

FIG. 8B is a graph of the output of the aperture linear sensor of the lens barrel in the first embodiment of the present invention;

FIG. 13A is an example of a live image of the subject displayed on a liquid crystal monitor pertaining to the first embodiment of the present invention;

FIG. 13B is an example of the reference image and the comparative image displayed on a liquid crystal monitor pertaining to the first embodiment of the present invention;

FIG. 13C is an example of the final image displayed on a liquid crystal monitor pertaining to the first embodiment of the present invention;

FIG. 15A is an example of a live image of the subject displayed on a liquid crystal monitor pertaining to the second embodiment of the present invention;

FIG. 15B is an example of the reference image and the comparative image displayed on a liquid crystal monitor pertaining to the second embodiment of the present invention; and FIG. 15C is an example of the final image displayed on a liquid crystal monitor pertaining to the second embodiment of the present invention.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Embodiments of the present invention will now be described through reference to the drawings.

1: Overall Configuration of Camera System

Figure 1:
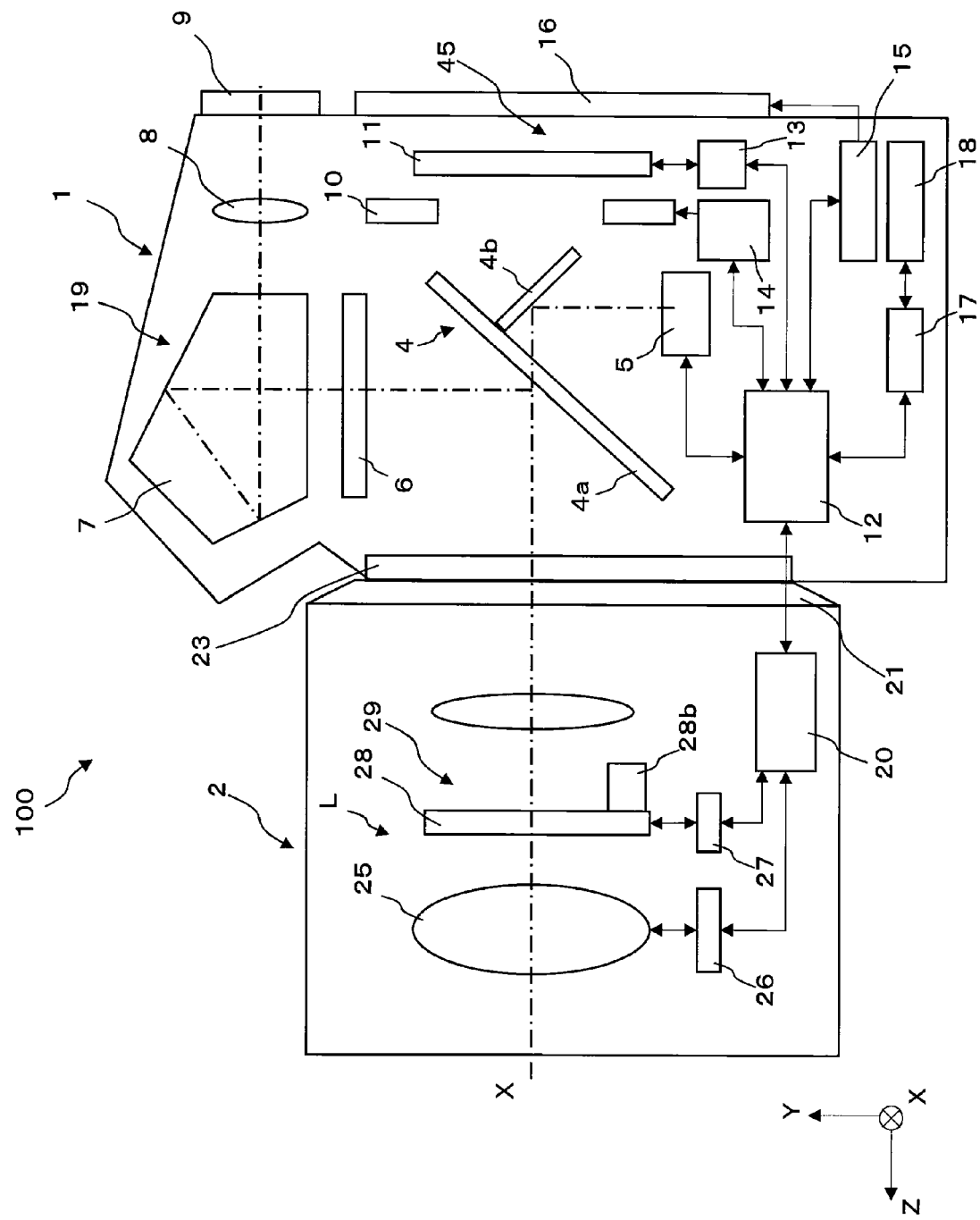
FIG. 1 is a block diagram of a control system for an interchangeable lens unit and digital camera main body pertaining to a first embodiment of the present invention.

The camera system 100 pertaining to the first embodiment of the present invention will be described. FIG. 1 is a diagram of the overall configuration of the camera system 100 pertaining to the first embodiment of the present invention.

The camera system 100 shown in FIG. 1 is an interchangeable lens type of single-lens reflex digital camera system. The camera system 100 includes a camera main body 1 and an interchangeable lens unit 2.

The camera system 100 and the interchangeable lens unit 2 exchange various control signals via an electrical contact (not shown) of a lens mount 21 on the interchangeable lens unit 2 side and an electrical contact (not shown) of a body mount 23 on the camera system 100 side.

1.1: Configuration of Interchangeable Lens Unit

The interchangeable lens unit 2 mainly includes an imaging optical system L, an aperture setting component 29 for adjusting the aperture of the imaging optical system L, and a lens microprocessor 20 for controlling various sequences of the interchangeable lens unit 2. The interchangeable lens unit 2 has the lens mount 21, and is removably mounted to the body mount 23 provided to the body front face of the camera main body 1.

The interchangeable lens unit 2 has the imaging optical system L for forming an optical image of a subject. Also, the lens microprocessor 20 is mounted to control the various sequences of the interchangeable lens unit 2 and to hold various kinds of lens information. A focus controller 26 for controlling the drive of a focus lens group 25 is mounted inside the interchangeable lens unit 2. An aperture controller 27 for controlling an aperture unit 28 is also mounted.

The imaging optical system L mainly includes the focus lens group 25 and the aperture unit 28.

The aperture setting component 29 mainly includes an aperture ring 40 which the user can turn to input aperture values, an aperture linear sensor 41 for outputting a physical quantity according to the rotational angle of the aperture ring 40, a diaphragm drive motor 28b for driving diaphragm blades, and the aperture controller 27 for adjusting the aperture to be equal to the set aperture value.

The lens microprocessor 20 is a control device serving as the functional center of the interchangeable lens unit 2 and is connected to various components mounted in the interchangeable lens unit 2. The lens microprocessor 20 also controls various sequences of the interchangeable lens unit 2. For example, a CPU and a memory 69 are installed in the lens microprocessor 20, and various functions can be realized by having the CPU read programs stored in the memory 69. The lens microprocessor 20 outputs commands (such as control signals) to the focus controller 26, the aperture controller 27, and so forth, and thereby executes control over the focus controller 26, the aperture controller 27, and so forth. Also, the lens microprocessor 20 is connected via an interface with a body microprocessor 12, and communicates with this body microprocessor 12.

1.2: Configuration of Camera Main Body

The camera main body 1 generally includes a quick return mirror 4, a focus detection unit 5, a viewfinder optical system 19, a shutter unit 10, an imaging component 45, an image display component 46, a photography mode switching component 48, a depth of field reviewing mode setting component 49, a shutter controller 14, an image recorder 18, and the body microprocessor 12. The quick return mirror 4 varies the path taken by light from the subject. The viewfinder optical system 19 is used for viewing a subject image. The focus detection unit 5 is used for performing focus detection. The shutter unit 10 opens and closes the shutter. The imaging component 45 is used for acquiring a subject image as a photographic image. The image display component 46 is for displaying a photographic image. The photography mode switching component 48 is used for switching between photography modes. The depth of field reviewing mode setting component 49 is for setting to depth of field reviewing mode. The shutter controller 14 controls the shutter unit 10, and the image recorder 18 records a photographic image. The body microprocessor 12 is used for controlling various sequences of the camera main body 1.

The viewfinder optical system 19 constitutes an observation optical system, the quick return mirror 4 constitutes a movable mirror, a photography mode switch button and the body microprocessor 12 constitute the photography mode switching component 48, and a depth of field reviewing button 76 and the body microprocessor 12 constitute the depth of field reviewing mode setting component 49.

Subject light that has passed through the interchangeable lens unit 2 is split into two beams (reflected light beam and transmitted light beam) by a main mirror 4a of the quick return mirror 4, and the reflected beam is guided to the viewfinder optical system 19. The transmitted beam, meanwhile, is reflected by a sub-mirror 4b provided on the rear face side of the quick return mirror 4, and is utilized as an AF light beam for the focus detection unit 5. The focus detection unit 5 generally makes use of a phase difference detection method.

The light beam reflected by the main mirror 4a forms an image on a viewfinder screen 6. The subject image formed on the viewfinder screen 6 can be observed through a viewfinder eyepiece window 9 via a pentaprism 7 and an eyepiece 8.

The body microprocessor 12 that controls various sequences is installed in the camera system 100. An imaging sensor controller 13 controls the drive of an imaging sensor 11. The shutter controller 14 controls the drive of the shutter unit 10. An image display controller 15 reads image data from the imaging sensor 11 and performs specific image processing, after which the photographic image is displayed on a liquid crystal monitor 16. An image recording controller 17 reads and writes photographic images through the image recorder 18 from and to a recording medium such as an SD card (not shown).

The quick return mirror 4 mainly includes the main mirror 4a and a sub-mirror 4b. The main mirror 4a is capable of reflecting and transmitting incident light. The sub-mirror 4b is provided on the rear face side of the main mirror 4a and reflects transmitted light from the main mirror 4a. The quick return mirror 4 can also be flipped up outside the optical path X by a quick return mirror controller 60. This quick return mirror 4 is disposed so as to be movable between the position shown in FIG. 2 and the position shown in FIG. 3. Also, incident light is split into two beams by the main mirror 4a, the reflected beam is guided to the viewfinder optical system 19, while the transmitted beam is reflected by the sub-mirror 4b and guided to the focus detection unit 5.

The viewfinder optical system 19 mainly includes the viewfinder screen 6 where an image of the subject is formed, the pentaprism 7 for converting the subject image into an erect image, the eyepiece 8 for guiding the erect image of the subject to the viewfinder eyepiece window 9, and the viewfinder eyepiece window 9 through which the user can see the subject.

The focus detection unit 5 is a unit for detecting whether or not an image formed by light from the subject is in a focused state (detecting focus) from the light reflected by the sub-mirror 4b. The focus detection unit 5 performs focus detection by a standard phase difference detection method, for example.

The imaging component 45 mainly includes the imaging sensor 11 (such as a CCD) for performing opto-electric conversion, and the imaging sensor controller 13 for controlling the imaging sensor 11. The imaging component 45 is arranged to acquire the subject image as a photographic image. The imaging component 45 converts the subject image produced by incident light into an electrical signal for forming a photographic image.

The image display component 46 includes the liquid crystal monitor 16 and the image display controller 15 that controls the operation of the liquid crystal monitor 16. The image recorder 18 records and reproduces photographic images to and from a card-type recording medium (not shown), for example. The image recorder 18 is controlled by the image recording controller 17, which controls the operation of the image recorder 18.

The body microprocessor 12 is a control device serving as the functional center of the camera main body 1, and controls various sequences. The body microprocessor 12 is equipped with a CPU, ROM, and RAM, for example, and the body microprocessor 12 can perform many different functions when programs held in the ROM are read by the CPU. The body microprocessor 12 outputs commands (such as control signals) to the shutter controller 14, the imaging sensor controller 13, the image display controller 15, the image recording controller 17, etc., and thereby executes control over the shutter controller 14, the imaging sensor controller 13, the image display controller 15, the image recording controller 17, etc. Also, the body microprocessor 12 is connected via an interface with the lens microprocessor 20, and communicates with this lens microprocessor 20.

1.3: Viewfinder Photography Mode and Monitor Photography Mode

This camera system 100 has a viewfinder photography mode and monitor photography mode as its photography modes. The viewfinder photography mode is a mode in which the user looks through the viewfinder eyepiece window 9 to see the subject, and is the ordinary photography mode for a conventional single-lens reflex camera.

Figure 2:
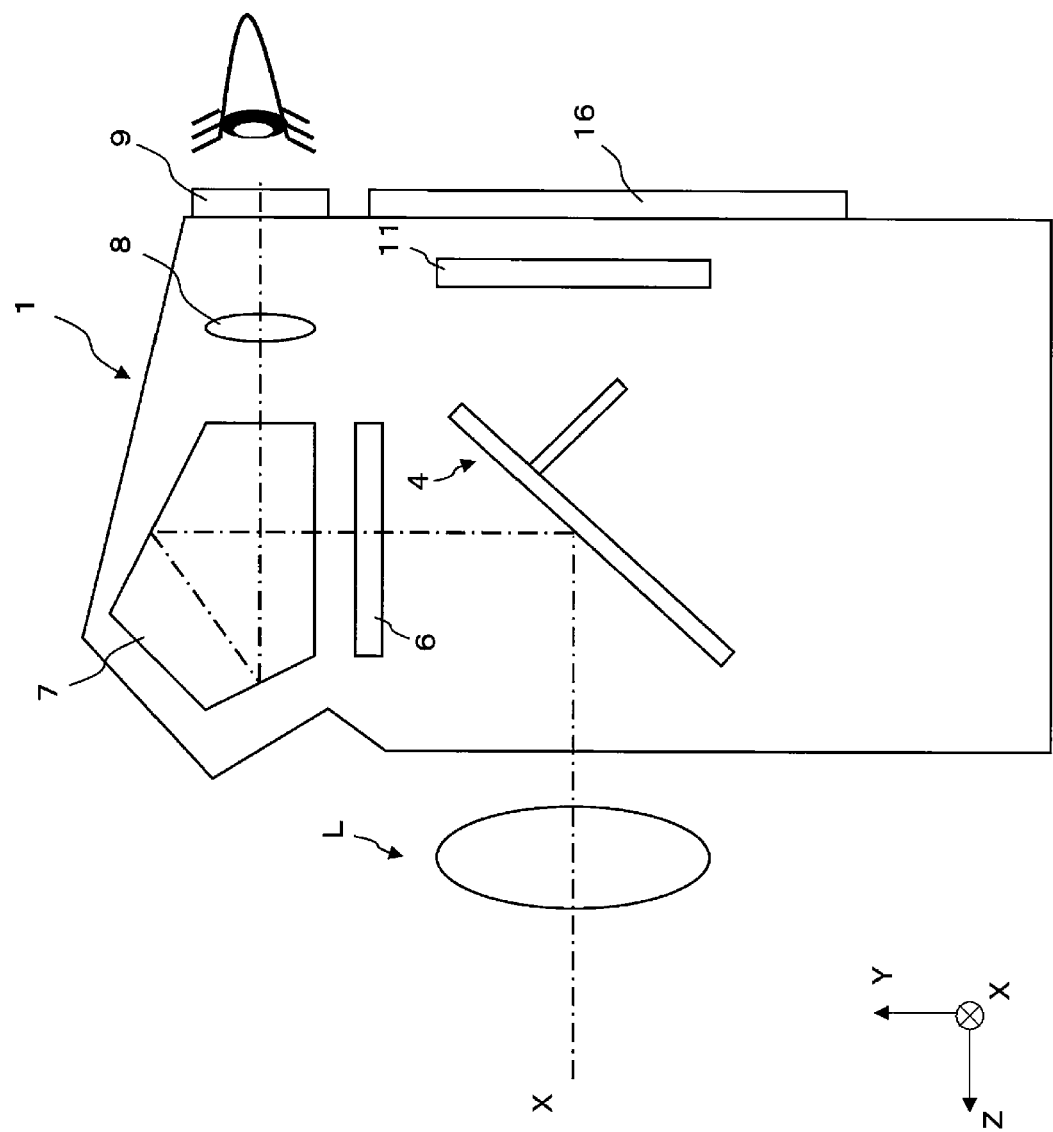
FIG. 2 is a concept diagram illustrating a viewfinder photography mode pertaining to the first embodiment of the present invention.

In this viewfinder photography mode, as shown in FIG. 2, the quick return mirror 4 is disposed in a specific position in optical path X, and subject light is guided to the viewfinder optical system 19, so the user can see the subject image through the viewfinder eyepiece window 9. During actual photography, the quick return mirror 4 flips up outside the optical path X, and the shutter unit 10 is opened so that the subject image is formed on the imaging face of the imaging sensor 11.

Figure 3:
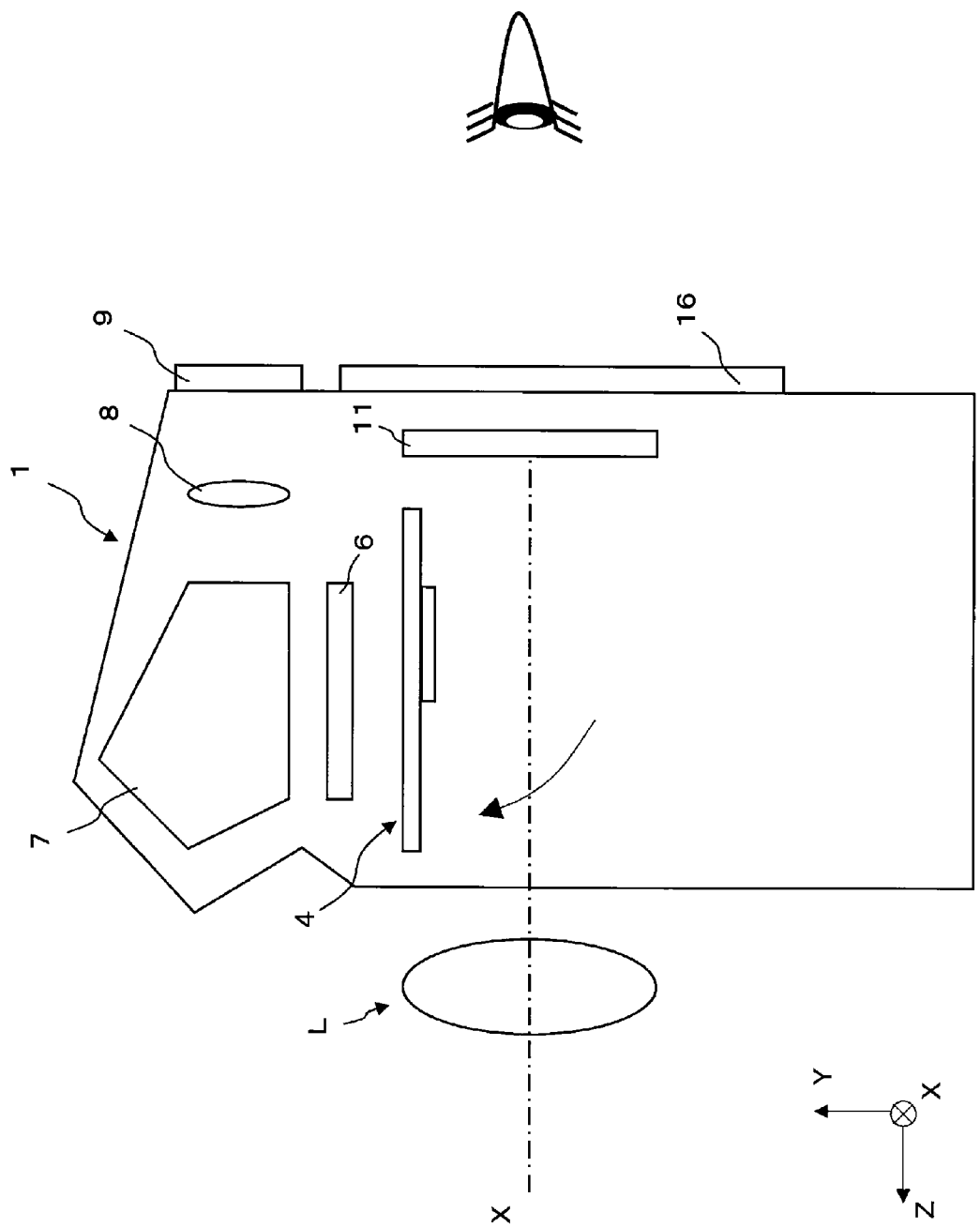
FIG. 3 is a concept diagram illustrating a monitor photography mode pertaining to the first embodiment of the present invention.

The monitor photography mode is a mode in which the user takes a photo while looking at the subject displayed on the liquid crystal monitor 16. In the monitor photography mode, as shown in FIG. 3, the quick return mirror 4 is retracted from the optical path X. The subject image, or what is known as a through-image, is displayed on the liquid crystal monitor 16 via the imaging sensor 11.

1.4: Configuration of Interchangeable Lens Unit

Figure 4:
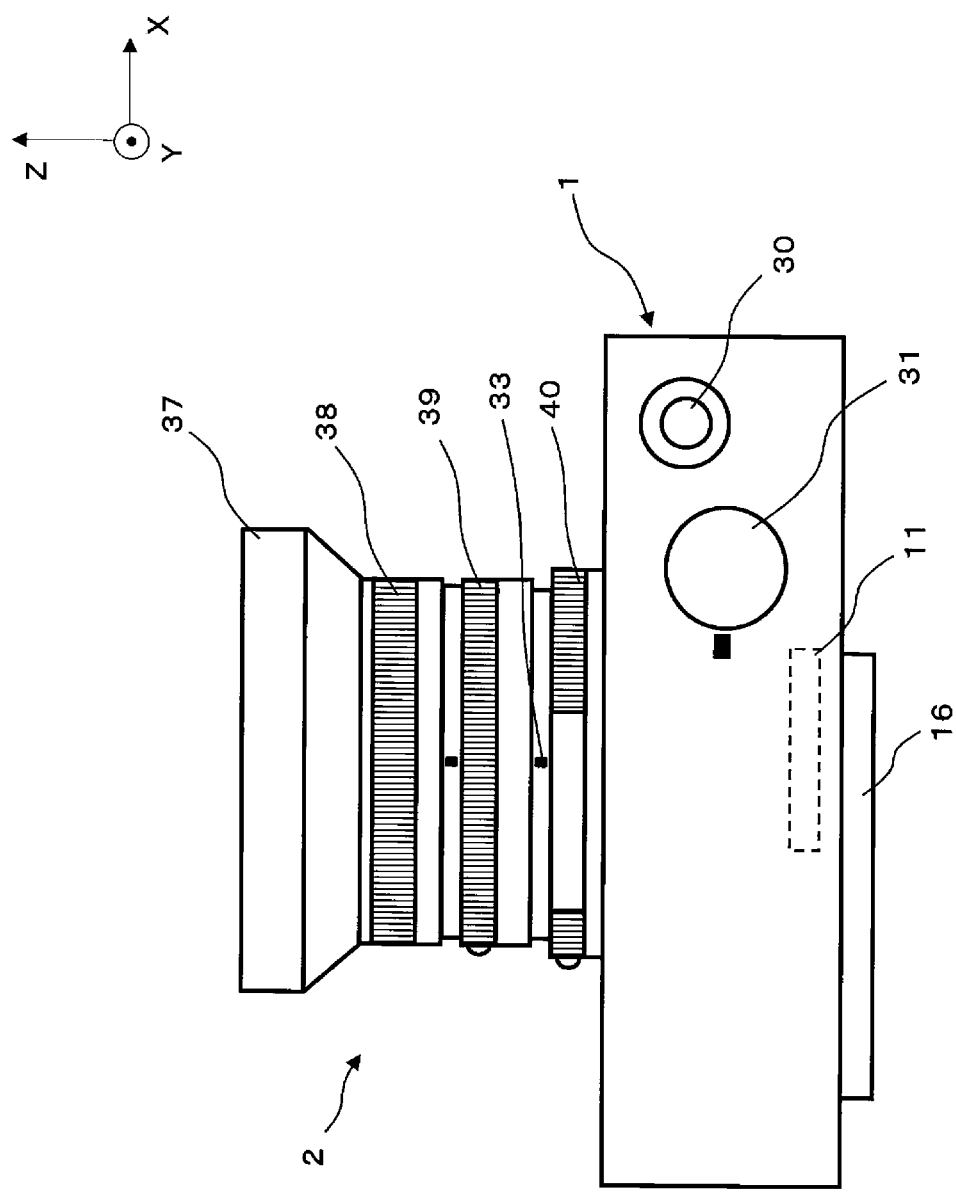
FIG. 4 is a top view of a digital camera pertaining to the first embodiment of the present invention.

FIG. 4 is a top view of the camera system 100 to which has been attached the interchangeable lens unit 2 pertaining to the first embodiment of the present invention. The X, Y, and Z axes are defined as shown in FIG. 4 (assuming the Z axis to be parallel to the optical axis of the lenses constituting the imaging optical system L).

The camera system 100 has a housing that is held by the user when the subject is being photographed. This camera system 100 includes a release button 30 and a shutter speed setting dial 31. The release button 30 and shutter speed setting dial 31 are provided on the right side of the upper face of the camera main body 1.

The shutter speed setting dial 31 is a control member that is turned to set the shutter speed. Also, the shutter speed setting dial 31 has an auto position in which the shutter speed is set automatically.

The main body of the camera system 100 includes the liquid crystal monitor 16. The liquid crystal monitor 16 is provided on the side of the camera system 100 main body that faces the user. The operation of the liquid crystal monitor 16 will be described below.

The interchangeable lens unit 2 has a filter mount 37 on the side closest to the subject (the positive side in the Z axial direction). The interchangeable lens unit 2 has a zoom ring 38, a focus ring 39, and the aperture ring 40, in that order from the filter mount 37 toward the camera system 100 main body side (the negative direction of the Z axis). The zoom ring 38, focus ring 39, and aperture ring 40 are all cylindrical rotating control members, and are rotatably disposed around the outer peripheral face of the interchangeable lens unit 2.

1.5: Configuration of Rear Face of Camera Main Body

Figure 5:
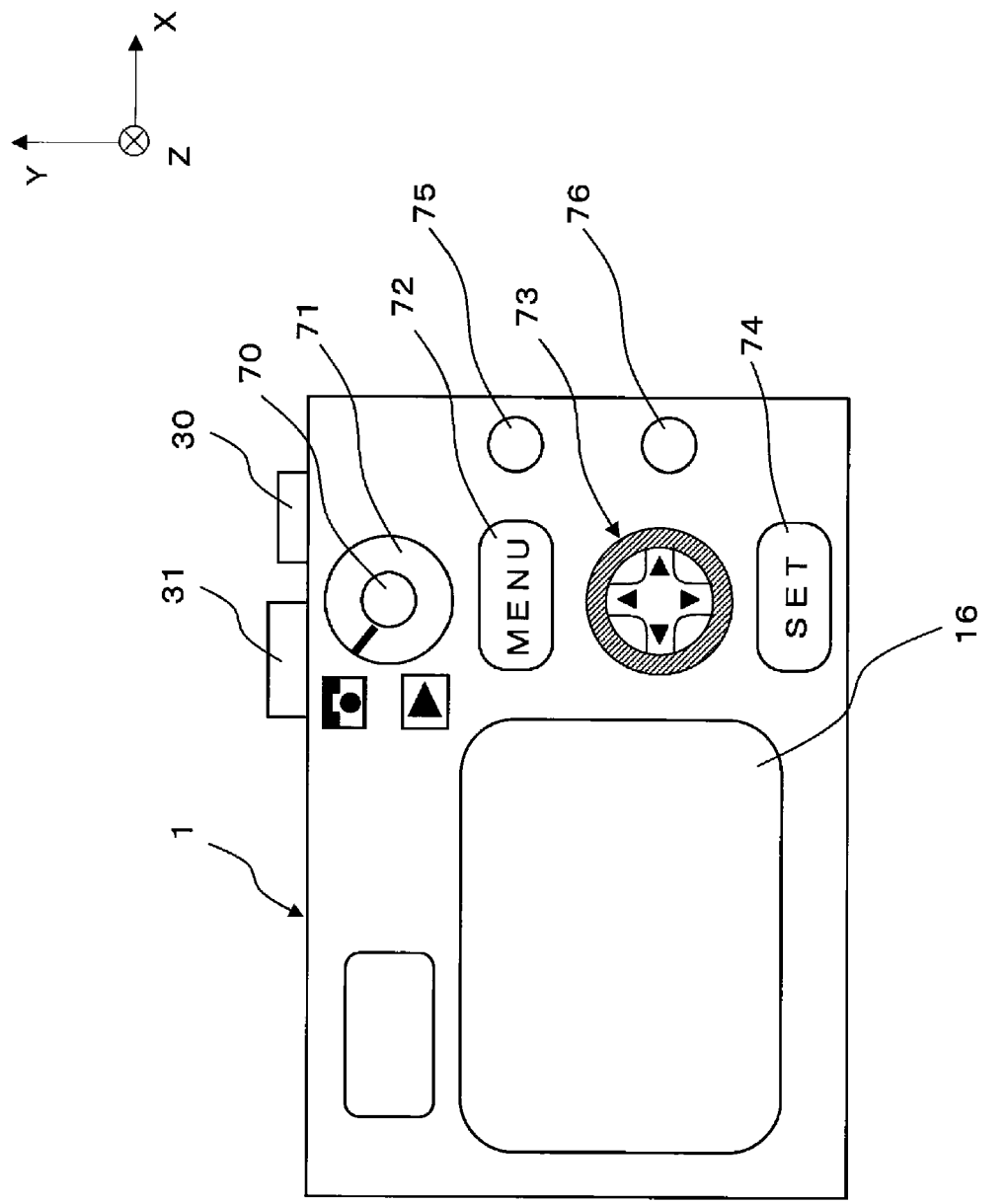
FIG. 5 is a rear view of the digital camera pertaining to the first embodiment of the present invention.

FIG. 5 is a rear view of the camera system 100 pertaining to the first embodiment of the present invention. The camera system 100 main body includes a power button 70, a photography/reproduction mode switching lever 71, a menu button 72, a directional arrow key 73, a set button 74, and a depth of field reviewing button 76.

The power button 70 is a control member that is operated to turn the power on and off to the camera system 100. The photography/reproduction mode switching lever 71 is a control member that is operated to switch between a photography mode and a reproduction mode by switching a lever. The photography mode referred to here is a mode that is set to capture a new subject image and create an image signal with the camera system 100. The reproduction mode is a mode that is set to display an image signal already captured and stored in the camera system 100.

The menu button 72 is a control member that is operated to display various operation menus on the liquid crystal monitor 16. The directional arrow key 73 has up, down, left, and right arrow keys, and is a control member that is operated to select displayed categories from various operation menus. The set button 74 is a control member that is operated to set the display categories on various operation menus.

The depth of field reviewing button 76 is a button for changing to a depth of field reviewing mode, which is discussed below. With the camera system 100, the user presses this depth of field reviewing button 76 to change to depth of field reviewing mode.

1.6: Aperture

Figure 6A:
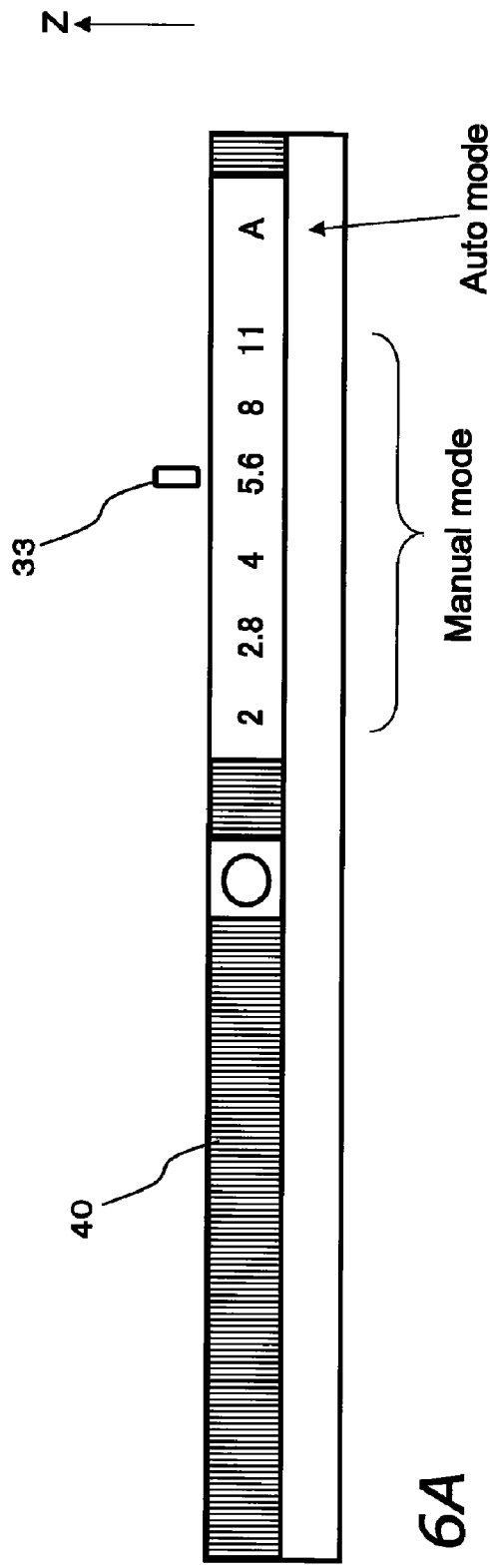
FIG. 6A is a development diagram of the outer peripheral face of an aperture ring pertaining to the first embodiment of the present invention.
Figure 6B:
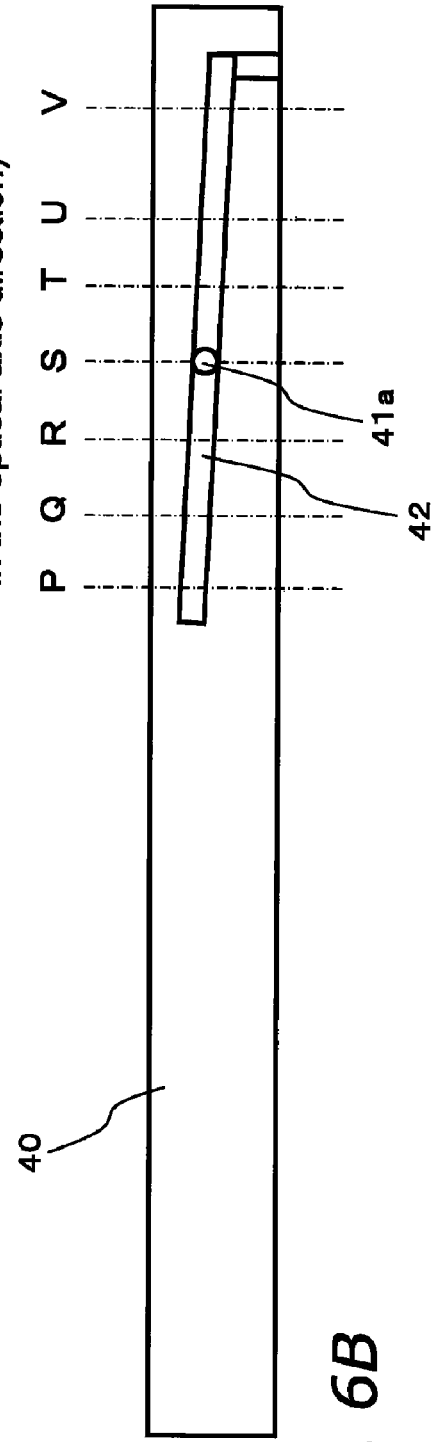
FIG. 6B is a development diagram of the inner peripheral face of the aperture ring pertaining to the first embodiment of the present invention.

The aperture ring 40 is cylindrical in shape. FIG. 6a is a development diagram of the outer peripheral face of the aperture ring pertaining to the first embodiment of the present invention, and FIG. 6b is a development diagram of the inner peripheral face of the aperture ring pertaining to the first embodiment of the present invention.

As shown in FIGS. 4 and 6a, aperture values are displayed on the outer peripheral face of the aperture ring 40. The display region of the aperture values is divided into two regions. In FIG. 6a, each display portion of 1AV (aperture value) from "2" to "11" corresponds to the aperture value of the manual region. Also, in FIG. 6a, the display portion "A" corresponds to the aperture value of the auto region. As shown in FIGS. 4 and 6b, the aperture ring 40 has a straight cam groove 42 on its inner peripheral face. The aperture value need not only be selected in 1AV increments.

The interchangeable lens unit 2 has the aperture unit 28 in its interior. The aperture unit 28 includes in its interior the diaphragm drive motor 28b for driving aperture blades (not shown). The diaphragm drive motor 28b drives the aperture blades in accordance with the rotational angle of the aperture ring 40 by control which will be described later. The aperture value of the imaging optical system L is changed by driving these aperture blades.

FIG. 7 is a partial cross section showing the linkage of the aperture linear sensor 41 and the aperture ring 40 pertaining to the first embodiment of the present invention. The aperture linear sensor 41 includes a slider 41a that has a cylindrical shape that protrudes to the outside of the aperture ring 40 in the radial direction. The cam groove 42 formed in the aperture ring 40 links with the slider 41a of the aperture linear sensor 41.

This aperture linear sensor 41 is mainly constituted by a circuit having a varistor as shown in FIG. 8A. The terminal T2 in FIG. 8A is connected to the slider 41a in FIG. 7, while the terminals T2 and T3 are connected to the two ends 41b and 41c of the aperture linear sensor in FIG. 7. When a specific voltage is applied between the terminals T1 and T3, the cylindrical slider 41a provided to the aperture linear sensor 41 slides over a magnetic resistor (not shown) inside the aperture linear sensor 41, causing the output of the terminal T2 (output voltage) to vary linearly as shown in FIG. 8B.

Figure 9:
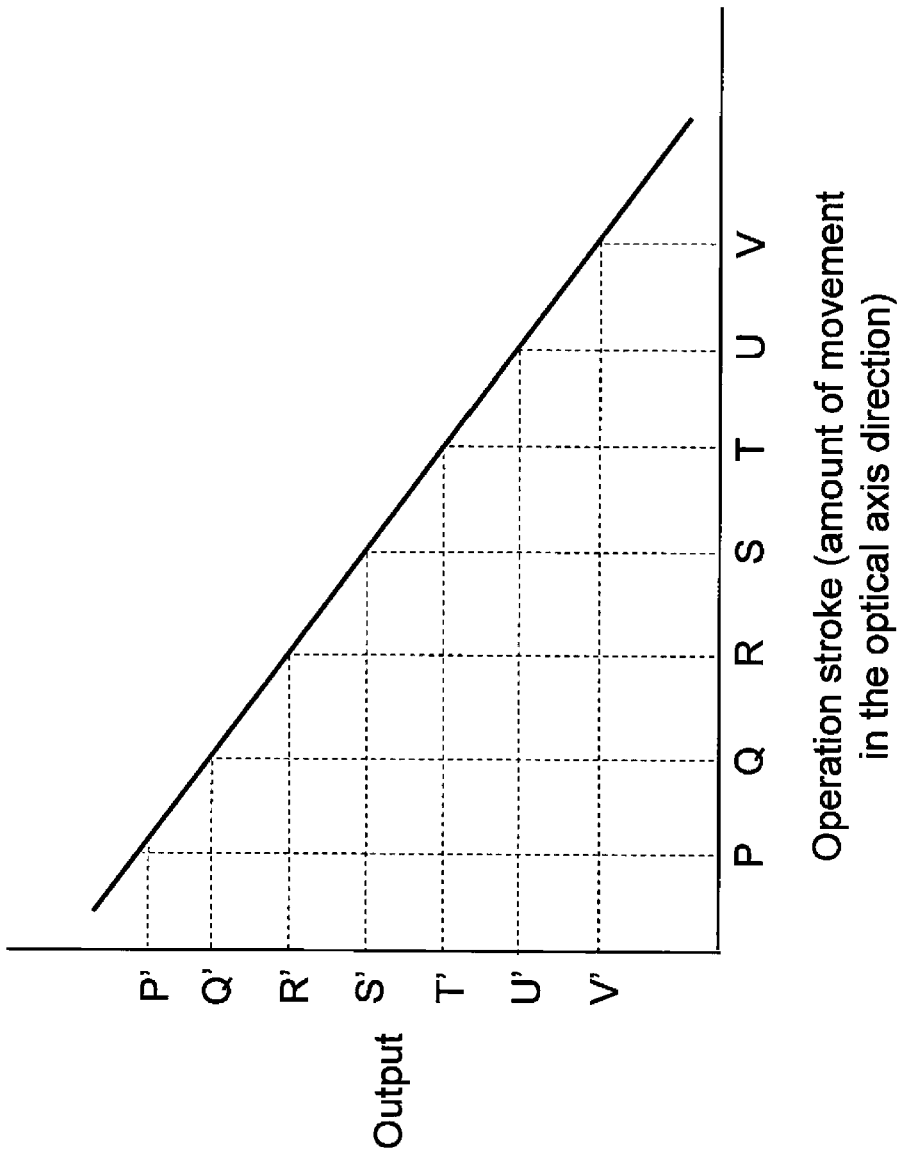
FIG. 9 is a graph of the relationship between the output value of the aperture linear sensor and the rotational angle of the aperture ring pertaining to the first embodiment of the present invention.

FIG. 9 is a graph of the relationship between the output value of the aperture linear sensor 41 (output voltage value) and the rotational angle of the aperture ring 40 pertaining to the first embodiment of the present invention. In FIGS. 4 and 6, when the aperture ring 40 is turned until the position where the number "2" is displayed on the aperture ring 40 matches up with the position of a pointer 33, the slider 41a of the aperture linear sensor 41 is in the position P on the cam groove 42. In this case, the output value of the aperture linear sensor 41 (output voltage value) is P'. That is, P' is the output voltage value of the aperture linear sensor 41 corresponding to the rotational angle of the aperture ring 40 when the position where the number "2" is displayed on the aperture ring 40 matches up with the position of the pointer 33.

Similarly, when the aperture ring 40 is turned until the positions where the numbers "2," "2.8," "4," "5.6," "8," "11," and "A" displayed on the aperture ring 40 match up with the position of the pointer 33, the slider 41a of the aperture linear sensor 41 is in the positions P, Q, R, S, T, U, and V, respectively, on the cam groove 42. In this case, the output values of the aperture linear sensor 41 (output voltage values) are P', Q', R', S', T', U', and V', respectively. That is, P', Q', R', S', T', U', and V' are the output voltage values of the aperture linear sensor 41 corresponding to the rotational angle of the aperture ring 40 when the positions where the numbers "2," "2.8," "4," "5.6," "8," "11," and "A" respectively, displayed on the aperture ring 40 match up with the position of the pointer 33.

Thus, the aperture linear sensor 41 indicates the output (output voltage value) that corresponds in a one-to-one ratio to the rotational angle of the aperture ring 40. Therefore, the rotational angle of the aperture ring 40 can be detected by the aperture linear sensor 41. The aperture linear sensor 41 outputs as a voltage change an aperture value signal corresponding to a rotational angle.

1.7: Control System for Camera Main Body

Figure 10:
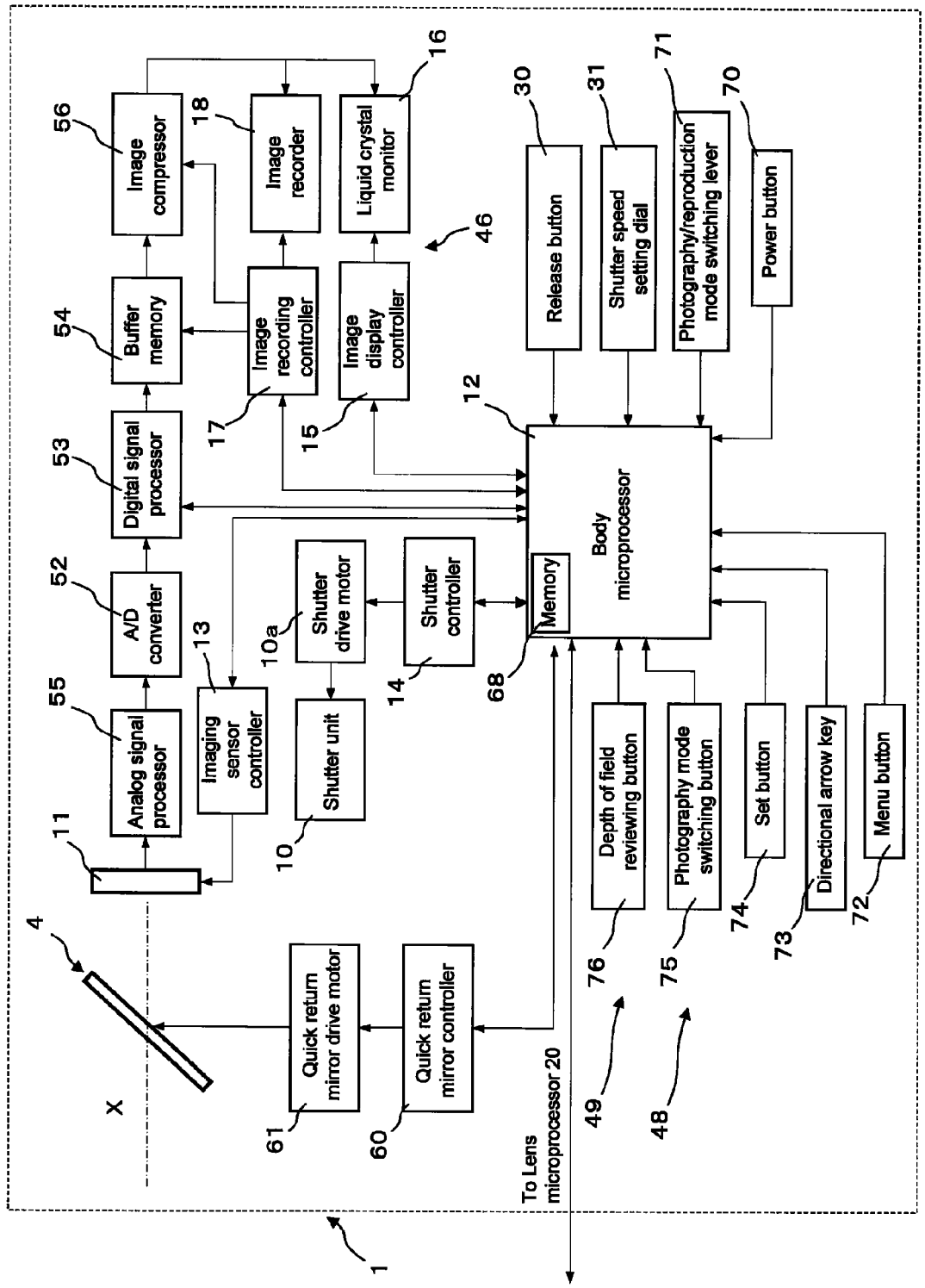
FIG. 10 is a block diagram of the control system inside the digital camera pertaining to the first embodiment of the present invention.

FIG. 10 is a block diagram of the control system of the camera system 100 pertaining to the first embodiment of the present invention.

The body microprocessor 12 can receive signals from the release button 30, the shutter speed setting dial 31, the photography/reproduction mode switching lever 71, the menu button 72, the directional arrow key 73, the set button 74, a photography mode switching button 75, and the depth of field reviewing button 76. Also, the body microprocessor 12 can send signals to the shutter controller 14 and the quick return mirror controller 60. Furthermore, the body microprocessor 12 can perform bidirectional communication between the body microprocessor 12 and the image recording controller 17, bidirectional communication between the body microprocessor 12 and the image display controller 15, and bidirectional communication between the body microprocessor 12 and a digital signal processor 53. The body microprocessor 12 also has a memory 68 for storing signals.

The shutter controller 14 drives a shutter drive motor 10a on the basis of a control signal from the body microprocessor 12. The quick return mirror controller 60 drives a quick return mirror drive motor 61 on the basis of a control signal from the body microprocessor 12.

The release button 30 sends information indicating shutter timing to the body microprocessor 12. The shutter speed setting dial 31 sends set shutter speed information and shutter motor information.

The imaging sensor 11 is constituted by a CCD (charge coupled device) or the like. The imaging sensor 11 converts an optical image formed by the imaging optical system L of the interchangeable lens unit 2 into an electrical image signal. The drive of the imaging sensor 11 is controlled by the imaging sensor controller 13. The image signal outputted from the imaging sensor 11 is processed by an analog signal processor 55, an A/D converter 52, a digital signal processor 53, a buffer memory 54, and an image compressor 56, in that order.

An image signal is sent from the imaging sensor 11 to the analog signal processor 55. The analog signal processor 55 subjects the image signal outputted by the imaging sensor 11 to analog signal processing, such as gamma processing. The image signal outputted from the analog signal processor 55 is sent to the A/D converter 52. The A/D converter 52 converts the analog image signal outputted from the analog signal processor 55 into a digital signal.

The image signal outputted from the A/D converter 52 is sent to the digital signal processor 53. The digital signal processor 53 subjects the image signal converted into a digital signal by the A/D converter 52 to digital signal processing, such as noise elimination or contour enhancement. The image signal outputted from the digital signal processor 53 is sent to the buffer memory 54. The buffer memory 54 temporarily stores the image signal processed by the digital signal processor 53. The buffer memory 54 consists of a RAM (random access memory) or the like.

The image signal outputted from the buffer memory 54 is sent to the image compressor 56 according to a command from the image recording controller 17. The image compressor 56 subjects the image signal to compression processing according to a command from the image recording controller 17. The image signal is compressed to a data size that is smaller than that of the original data. The compression method can be, for example, JPEG (Joint Photographic Experts Group).

The compressed image signal is sent from the image compressor 56 to the image recorder 18 and the liquid crystal monitor 16. Meanwhile, the body microprocessor 12 sends a control signal to the image recording controller 17 and the image display controller 15. The image recording controller 17 controls the image recorder 18 on the basis of a control signal from the body microprocessor 12. The image display controller 15 controls the liquid crystal monitor 16 on the basis of a control signal from the body microprocessor 12.

The image recorder 18 records the image signal to an internal memory and/or removable memory on the basis of a command from the image recording controller 17. The image recorder 18 records information to be stored along with the image signal to an internal memory and/or removable memory on the basis of a command from the image recording controller 17. The information to be stored along with the image signal includes the date and time the image was captured, focal distance information, shutter speed information, aperture value information, and photography mode information.

The liquid crystal monitor 16 displays the image signal as a visible image on the basis of a command from the image display controller 15. The liquid crystal monitor 16 displays information to be displayed along with the image signal on the basis of a command from the image display controller 15. The information to be displayed along with the image signal includes focal distance information, shutter speed information, aperture value information, photography mode information, and focus state information.

Also, the liquid crystal monitor 16 displays a setting screen to be set by the user, etc., in a specific photography/reproduction mode on the basis of a command from the image display controller 15.

When the user, etc., captures an image, the power button 70 is switched on and the photography/reproduction mode switching lever 71 is put in the photography mode. This turns on the power to the camera system 100 main body, and an optical image of the subject which has been converted into an electrical image signal by the imaging sensor 11 is displayed as a visible image on the basis of a command from the image display controller 15.

When the camera system 100 is in its photography mode and the user presses the menu button 72, the liquid crystal monitor 16 displays the setting categories that can be changed by the user in photography mode as an iconized setting menu screen on the basis of a command from the image display controller 15.

1.8: Interchangeable Lens Unit Control System

Figure 11:
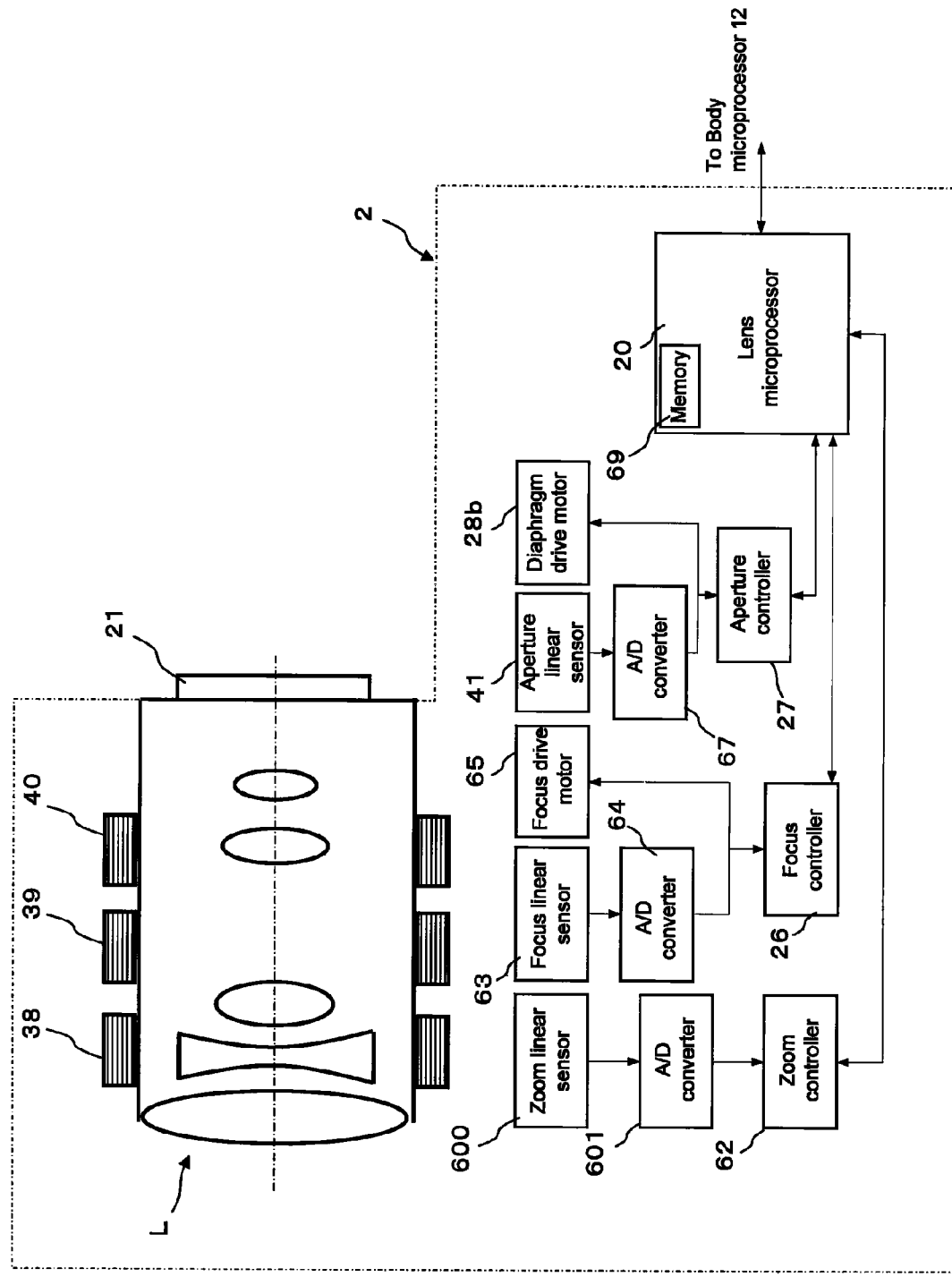
FIG. 11 is a block diagram of the control system inside the interchangeable lens unit pertaining to the first embodiment of the present invention.

FIG. 11 is a block diagram of the control system inside the interchangeable lens unit 2 pertaining to the first embodiment of the present invention.

The lens microprocessor 20 can perform bidirectional communication between the lens microprocessor 20 and a zoom controller 62, bidirectional communication between the lens microprocessor 20 and the focus controller 26, and bidirectional communication between the lens microprocessor 20 and the aperture controller 27.

The zoom controller 62 can receive signals from a zoom linear sensor 600 via an A/D converter 601. The zoom controller 62 converts the amount of rotation of the zoom ring 38 detected by the zoom linear sensor 600 into focal distance information about the imaging optical system L. The zoom controller 62 sends focal distance information to the lens microprocessor 20.

The focus controller 26 can receive signals from a focus linear sensor 63, and can send signals to a focus drive motor 65 via an A/D converter 64. The focus controller 26 determines the focus mode from the rotational angle of the focus ring 39, which is detected by the focus linear sensor 63 and digitized by the A/D converter 64. The focus controller 26 sends the result of this determination to the lens microprocessor 20. The focus controller 26 sends focal distance information detected from the rotational angle of the focus ring 39 to the lens microprocessor 20 on the basis of a command from the lens microprocessor 20. The focus controller 26 drives the focus drive motor 65 on the basis of a control signal from the lens microprocessor 20.

The aperture controller 27 can receive signals from the aperture linear sensor 41. The aperture controller 27 can also send signals to the diaphragm drive motor 28b via the A/D converter 67. The aperture controller 27 determines the aperture mode from the rotational angle of the aperture ring 40, which is detected by the aperture linear sensor 41 and digitized by the A/D converter 67. The aperture controller 27 sends the result of this determination to the lens microprocessor 20. The aperture controller 27 sends aperture value information detected from the rotational angle of the aperture ring 40 to the lens microprocessor 20 on the basis of a command from the lens microprocessor 20. The aperture controller 27 drives the diaphragm drive motor 28b on the basis of a control signal from the lens microprocessor 20.

2: Operation of Camera System 2.1: Photographic Operation of Camera System 100 (Viewfinder Photography Mode)

Next, the photographic operation of the camera system 100 will be described. First, the drive sequence in viewfinder photography mode, in which the user looks through the viewfinder eyepiece window 9, will be described through reference to FIGS. 1, 2, 10, and 11.

When the user presses the release button 30 halfway down, power is supplied to the body microprocessor 12 and the various units in the camera system 100. The body microprocessor 12 in the camera system 100, which is activated by the supply of power, receives various kinds of lens data from the lens microprocessor 20 in the interchangeable lens unit 2, which is also activated by the supply of power, via the lens mount 21 and the body mount 23, and stores this data in the built-in memory 68. Then, the body microprocessor 12 acquires the amount of defocus (hereinafter referred to as the Df amount) from the focus detection unit 5, and instructs the lens microprocessor 20 to drive the focus lens group 25 by this Df amount. The lens microprocessor 20 controls the focus controller 26 so as to operate the focus lens group 25 by the Df amount. While this focus detection and drive of the focus lens group 25 are repeated, the Df amount decreases, and at the point when the amount drops to or below a specific level, the body microprocessor 12 determines that focus has been achieved and halts the drive of the focus lens group 25.

After this, when the user presses the release button 30 all the way down, the body microprocessor 12 instructs the lens microprocessor 20 to adjust the aperture value to what has been calculated on the basis of the output from a light sensor (not shown). The lens microprocessor 20 controls the aperture controller 27, and the aperture is stopped-down to the designated aperture value. Simultaneously with the designation of the aperture value, the body microprocessor 12 uses the quick return mirror controller 60 to retract the quick return mirror 4 from within the optical path X. Upon completion of this retraction, the imaging sensor controller 13 instructs that the imaging sensor 11 be driven, and instructs that the shutter unit 10 be operated. The imaging sensor controller 13 exposes the imaging sensor 11 for the length of time of the shutter speed calculated on the basis of the output from a light sensor (not shown).

Upon completion of this exposure, the imaging sensor controller 13 reads image data from the imaging sensor 11, and after undergoing specific image processing, this image data is displayed as a photographic image on the liquid crystal monitor 16. Also, image data that has been read from the imaging sensor 11 and has undergone specific image processing is written as image data to a storage medium via the image recorder 18. Also, upon completion of the exposure, the quick return mirror 4 and the shutter unit 10 are reset to their initial positions. The body microprocessor 12 instructs the lens microprocessor 20 to reset the aperture to its open position, and the lens microprocessor 20 issues reset commands to the various units. Upon completion of this resetting, the lens microprocessor 20 notifies the body microprocessor 12 of the completion of resetting. The body microprocessor 12 waits for the completion of a series of processing after exposure and the reset completion information from the lens microprocessor 20, and then confirms that the release button has not been pressed, which concludes the imaging sequence.

2.2: Operation in Monitor Photography Mode

Next, the drive sequence in monitor photography mode, in which the user captures an image using the liquid crystal monitor 16, will be described through reference to FIGS. 1, 3, 10, and 11.

When the liquid crystal monitor 16 is used to capture an image, the user presses the photography mode switching button 75 to set the camera to monitor photography mode. When the camera is set to monitor photography mode, the body microprocessor 12 retracts the quick return mirror 4 from within the optical path X. As a result, light from the subject reaches the imaging sensor 11, so the imaging sensor 11 converts the light from the subject imaged on the imaging sensor 11 into image data, allowing it to be acquired and outputted as image data. The image data read from the imaging sensor 11 by the imaging sensor controller 13 is subjected to specific image processing, after which it is displayed as a photographic image on the liquid crystal monitor 16. Thus displaying the photographic image on the liquid crystal monitor 16 allows the user to follow the subject without looking through the viewfinder eyepiece window 9.

Next, the user presses the release button 30 halfway down, whereupon the body microprocessor 12 receives various kinds of lens data from the lens microprocessor 20 in the interchangeable lens unit 2 via the lens mount 21 and the body mount 23. This lens data is stored in the built-in memory 68. Then, the body microprocessor 12 uses the quick return mirror controller 60 to return the quick return mirror 4 to a specific position within the optical path X, acquires the Df amount from the focus detection unit 5, and instructs the lens microprocessor 20 to drive the focus lens group 25 by this Df amount. The lens microprocessor 20 controls the focus controller 26 so as to operate the focus lens group 25 by the Df amount. While this focus detection and drive of the focus lens group 25 are repeated, the Df amount decreases, and at the point when the amount drops to or below a specific level, the body microprocessor 12 determines that focus has been achieved and halts the drive of the focus lens group 25.

After this, when the user presses the release button 30 all the way down, the body microprocessor 12 instructs the lens microprocessor 20 to adjust the aperture value to what has been calculated on the basis of the output from a light sensor (not shown). The lens microprocessor 20 controls the aperture controller 27, and the aperture is stopped-down to the designated aperture value. Simultaneously with the designation of the aperture value, the body microprocessor 12 uses the quick return mirror controller 60 to retract the quick return mirror 4 from within the optical path X. Upon completion of this retraction, the imaging sensor controller 13 instructs that the imaging sensor 11 be driven, and instructs that the shutter unit 10 be operated. The imaging sensor controller 13 exposes the imaging sensor 11 for the length of time of the shutter speed calculated on the basis of the output from a light sensor (not shown).

Upon completion of this exposure, the imaging sensor controller 13 reads image data from the imaging sensor 11. After undergoing specific image processing, this image data is displayed as a photographic image on the liquid crystal monitor 16. Also, image data that has been read from the imaging sensor 11 and has undergone specific image processing is written as image data to a storage medium via the image recorder 18. Also, upon completion of the exposure, the quick return mirror 4 and the shutter unit 10 are positioned in a state of being retracted from within the optical path X, so the user can then use the monitor photography mode to view the subject as a photographic image on the liquid crystal monitor 16.

When the monitor photography mode is to be canceled, the user presses the photography mode switching button 75 and changes back to the ordinary photography mode. The ordinary photography mode is the viewfinder photography mode in which the user looks through the viewfinder eyepiece window 9 to capture an image. When the camera is changed back to viewfinder photography mode, the quick return mirror 4 is returned to a specific position within the optical path X. The quick return mirror 4 is also returned to a specific position within the optical path X when the power is shut off to the camera system 100 (such as a single-lens reflex digital camera) main body.

2.3: Exposure Setting Operation for Camera System

Next, the operation of setting the exposure for the camera system 100 will be described through reference to FIGS. 4 and 10. The camera system 100 has four exposure setting modes: a programmed photography mode in which exposure setting is performed automatically for an ordinary photographic region; a shutter speed preferential photography mode in which the shutter speed is set manually; an aperture preferential photography mode in which the aperture value is set manually; and a manual photography mode in which the shutter speed and aperture value are both set manually.

A user operating the camera system 100 can select among the four exposure setting modes by setting a combination of a specific rotational angle of the aperture ring 40 and the rotational angle of the shutter speed setting dial 31. Specifically, in a state in which the letter "A" on the aperture ring 40 lines up with the pointer 33, the user can set the camera to the programmed photography mode by putting the shutter speed setting dial 31 in the auto position. In a state in which the letter "A" on the aperture ring 40 lines up with the pointer 33, the user can set the camera to the shutter speed preferential photography mode by putting the shutter speed setting dial 31 in the manually settable position. In a state in which any of the numbers "2" to "11" on the aperture ring 40 lines up with the pointer 33, the user can set the camera to the aperture preferential photography mode by putting the shutter speed setting dial 31 in the auto position. In a state in which any of the numbers "2" to "11" on the aperture ring 40 lines up with the pointer 33, the user can set the camera to the manual photography mode by putting the shutter speed setting dial 31 in the manual position.

From here on, of these four exposure setting modes, the programmed photography mode and the shutter speed preferential photography mode will be collectively referred to as the auto aperture mode, and the aperture preferential photography mode and manual photography mode will be collectively referred to as the manual aperture mode.

2.4: Exposure Setting Operation in Auto Aperture Mode

The aperture linear sensor 41 outputs a signal corresponding to rotational angle to the aperture controller 27. When the letter "A" on the aperture ring 40 lines up with the pointer 33, and the user presses the release button 30, the aperture controller 27 determines that the exposure setting mode is the auto aperture mode on the basis of the signal received from the aperture linear sensor 41. The result of this determination is sent to the lens microprocessor 20 and the body microprocessor 12 (sending to the body microprocessor 12 is carried out via microprocessor communication between the lens microprocessor 20 and the body microprocessor 12).

Also, the shutter speed setting dial 31 outputs a signal corresponding to rotational angle to the body microprocessor 12. The body microprocessor 12 recognizes that the exposure setting mode is the auto aperture mode on the basis of the determination result received from the aperture controller 27 and the signal from the shutter speed setting dial 31.

The body microprocessor 12 sends a command to the digital signal processor 53. The digital signal processor 53 sends the body microprocessor 12 an image signal at a specific timing on the basis of the received command. The body microprocessor 12 computes an exposure value on the basis of the received image signal. If the exposure setting mode is the programmed photography mode, the body microprocessor 12 computes a suitable combination from the adjustable aperture value and shutter speed. If the exposure setting mode is the shutter speed preferential photography mode, the body microprocessor 12 computes a suitable aperture value for the set shutter speed.

The body microprocessor 12 produces a control signal on the basis of the computation result. The body microprocessor 12 sends a control signal based on the computed aperture value to the aperture controller 27 via the lens microprocessor 20 on the interchangeable lens unit 2 side. If the exposure setting mode is the programmed photography mode, the body microprocessor 12 sends a control signal based on the computed shutter speed to the shutter controller 14. If the exposure setting mode is the shutter speed preferential photography mode, the body microprocessor 12 sends the shutter controller 14 information about the shutter speed set by the shutter speed setting dial 31.

Also, the body microprocessor 12 sends a control signal to the image display controller 15. The image display controller 15 drives the liquid crystal monitor 16. When the content of the control signal designates the programmed photography mode, the liquid crystal monitor 16 indicates that the exposure setting mode is the programmed photography mode. When the content of the control signal designates the shutter speed preferential photography mode, the liquid crystal monitor 16 gives a display indicating that the exposure setting mode is the shutter speed preferential photography mode.

The aperture controller 27 produces a drive signal for driving the diaphragm drive motor 28b on the basis of a control signal from the lens microprocessor 20. The diaphragm drive motor 28b is driven on the basis of this drive signal. The drive of the diaphragm drive motor 28b results in the aperture blades being driven.

The shutter controller 14 produces a drive signal for driving the shutter drive motor 10a on the basis of a control signal from the body microprocessor 12. The shutter drive motor 10a is driven on the basis of this drive signal. The drive of the shutter drive motor 10a results in the shutter unit 10 being driven.

Exposure setting in the auto aperture mode of the camera system 100 is performed as discussed above. The above operation is executed instantly after the operation of the release button 30 by the user.

When imaging is complete, the body microprocessor 12 sends a control signal to the image recording controller 17. The image recorder 18 records an image signal to an internal memory and/or removable memory on the basis of a command from the image recording controller 17.

When the content of the control signal designates the programmed photography mode, the image recorder 18 records an image signal and information indicating that the exposure setting mode is the programmed photography mode to an internal memory and/or removable memory on the basis of a command from the image recording controller 17. When the content of the control signal designates the shutter speed preferential photography mode, the image recorder 18 records an image signal and information indicating that the exposure setting mode is the shutter speed preferential photography mode to an internal memory and/or removable memory on the basis of a command from the image recording controller 17.

2.5: Exposure Setting Operation in Manual Aperture Mode

Next, when the position of any of the numbers "2" to "11" on the aperture ring 40 lines up with the pointer 33, and the user presses the release button 30, the aperture controller 27 determines that the exposure setting mode is the manual aperture mode on the basis of the signal received from the aperture linear sensor 41. The result of this determination is sent to the lens microprocessor 20. Also, the shutter speed setting dial 31 outputs a signal corresponding to rotational angle to the body microprocessor 12.

The body microprocessor 12 recognizes that the exposure setting mode is the manual aperture mode on the basis of the determination result received from the aperture controller 27 and the signal from the shutter speed setting dial 31.

The lens microprocessor 20 requests the aperture controller 27 to provide aperture value information detected from the rotational angle of the aperture ring 40. The aperture controller 27 sends the aperture value information detected from the rotational angle of the aperture ring 40 on the basis of a command from the lens microprocessor 20 to the lens microprocessor 20 and the body microprocessor 12 (sending to the body microprocessor 12 is carried out via microprocessor communication between the lens microprocessor 20 and the body microprocessor 12). If the exposure setting mode is the aperture preferential photography mode, the body microprocessor 12 sends a command to the digital signal processor 53. The digital signal processor 53 sends an image signal to the body microprocessor 12 at a specific timing on the basis of the received command.

If the exposure setting mode is the aperture preferential photography mode, the body microprocessor 12 computes the shutter speed on the basis of the received image signal. If the exposure setting mode is the aperture preferential photography mode, the body microprocessor 12 computes a suitable shutter speed for the detected aperture value. If the exposure setting mode is the aperture preferential photography mode, the body microprocessor 12 produces a control signal on the basis of the computation result. If the exposure setting mode is the aperture preferential photography mode, the body microprocessor 12 sends a control signal based on the computed shutter speed to the shutter controller 14. If the exposure setting mode is the manual photography mode, the body microprocessor 12 sends information about the shutter speed set by the shutter speed setting dial 31 to the shutter controller 14.

Also, the body microprocessor 12 sends a control signal to the image display controller 15. The image display controller 15 drives the liquid crystal monitor 16. When the content of the control signal designates the aperture preferential photography mode, the liquid crystal monitor 16 indicates that the exposure setting mode is the aperture preferential photography mode. When the content of the control signal designates the manual photography mode, the liquid crystal monitor 16 indicates that the exposure setting mode is the manual photography mode.

The aperture controller 27 produces a drive signal for driving the diaphragm drive motor 28b on the basis of a control signal from the lens microprocessor 20. The diaphragm drive motor 28b is driven on the basis of this drive signal. The drive of the diaphragm drive motor 28b results in the aperture blades being driven. The shutter controller 14 produces a drive signal for driving the shutter drive motor 10a on the basis of a control signal from the body microprocessor 12. The shutter drive motor 10a is driven on the basis of this drive signal. The drive of the shutter drive motor 10a results in the shutter unit 10 being driven.

Exposure setting in the manual aperture mode of the camera system 100 is performed as discussed above. The above operation is executed instantly after the operation of the release button 30 by the user.

When imaging is complete, the body microprocessor 12 sends a control signal to the image recording controller 17. The image recorder 18 records an image signal to an internal memory and/or removable memory on the basis of a command from the image recording controller 17.

When the content of the control signal designates the aperture preferential mode, the image recorder 18 records an image signal and information indicating that the exposure setting mode is the aperture preferential mode to an internal memory and/or removable memory on the basis of a command from the image recording controller 17. When the content of the control signal designates the manual photography mode, the image recorder 18 records an image signal and information indicating that the exposure setting mode is the manual photography mode to an internal memory and/or removable memory on the basis of a command from the image recording controller 17.

2.6: Operation in Depth Confirmation Mode

Figure 12:
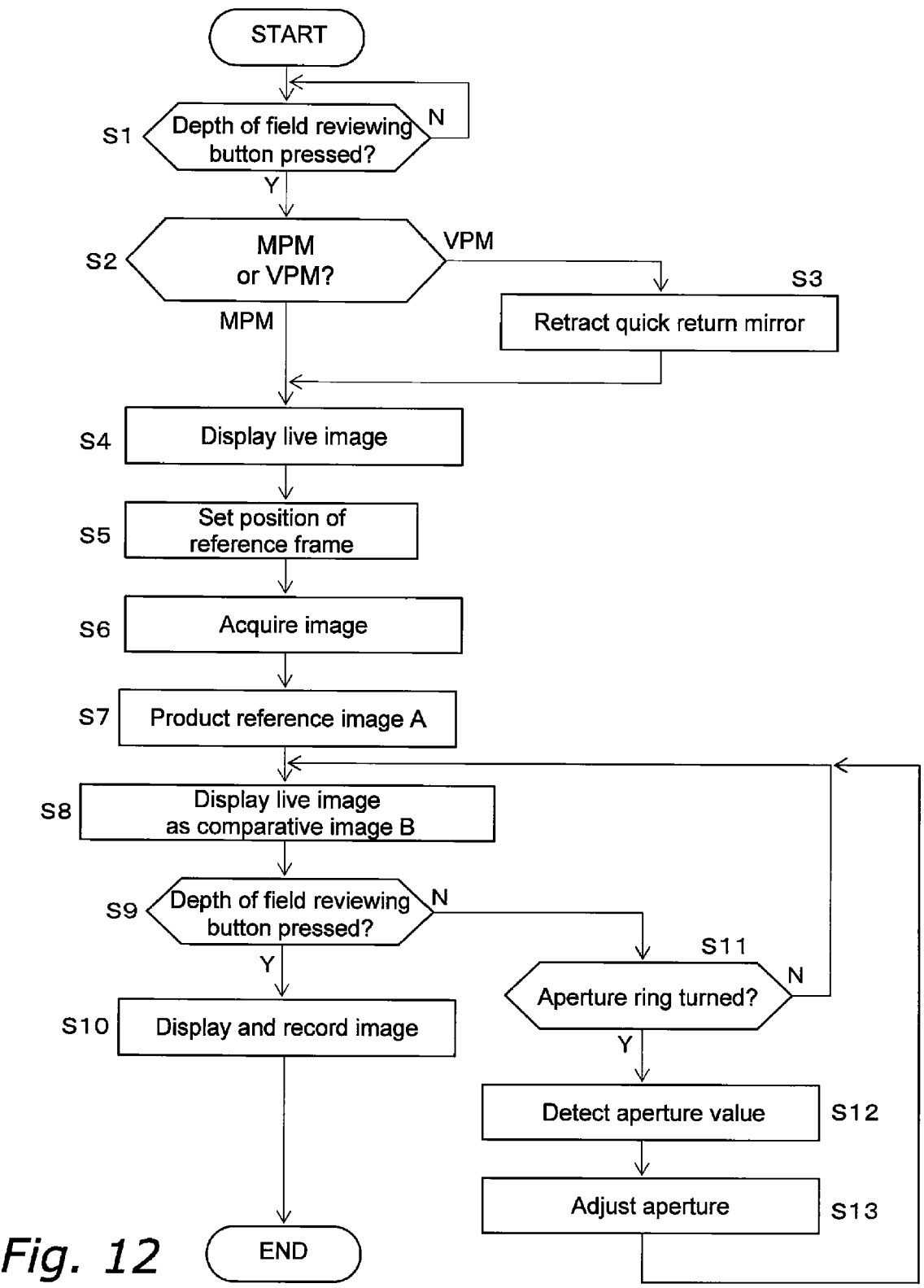
FIG. 12 is a flowchart of the depth of field reviewing mode pertaining to the first embodiment of the present invention.

With this camera system 100, a depth of field reviewing mode is further provided so that a plurality of images with different aperture values can be compared side by side. The specific operation in depth of field reviewing mode will be described through reference to FIGS. 12 and 13. FIG. 12 is a flowchart of the depth of field reviewing mode. FIG. 13A is an example of how live images of the subject are displayed on the liquid crystal monitor 16.

As shown in FIG. 12, the body microprocessor 12 of the camera system 100 determines whether or not the depth of field reviewing button 76 (FIG. 5) has been pressed (step S1). If the depth of field reviewing button 76 has been pressed, the mode changes to depth of field reviewing mode. More specifically, the body microprocessor 12 determines whether the photography mode is the monitor photography mode or the viewfinder photography mode (step S2). If the photography mode is the monitor photography mode, then as shown in FIG. 13A, for example, a live image of the subject is displayed on the liquid crystal monitor 16 (step S4). On the other hand, if the photography mode is the viewfinder photography mode, the quick return mirror 4 is retracted from the optical path X (step S3) and a live image of the subject is displayed on the liquid crystal monitor 16 (step S4). At this point, a live image of the subject is displayed on the liquid crystal monitor 16 at the aperture value (such as F8) set by the aperture ring 40 when the mode changes to the depth of field reviewing mode (when the depth of field reviewing button 76 is pressed).

Next, a reference image is set that will serve as a reference for comparison. More specifically, as shown in FIG. 13A, a reference frame 51 for setting the region to be compared is displayed on the liquid crystal monitor 16. The reference frame 51 can be moved to the right or left side of a display region 16a by pressing the directional arrow key 73. A symmetry axis 51a for inversion processing is automatically selected at this point according to the position of the reference frame 51. More specifically, as shown in FIG. 13A, when the reference frame 51 is disposed on the left side, the right edge of the reference frame 51 is automatically selected as the symmetry axis 51a. When the reference frame 51 is disposed on the right side, the left edge of the reference frame 51 is automatically selected as the symmetry axis 51a. For example, when the position of the reference frame 51 is moved to the left side with the directional arrow key 73, and the set button 74 is pressed, the position of the reference frame 51 is set to the position shown in FIG. 13A, and at the same time, the right edge of the reference frame 51 is set as the symmetry axis 51a (step S5).

Also, when the set button 74 is pressed, an image of the subject is acquired by the imaging component 45 (step S6). The acquired image is temporarily stored as image data in the memory 68 of the body microprocessor 12. An image A1 of the region corresponding to the reference frame 51 is extracted by the body microprocessor 12 from the stored image data. The body microprocessor 12 subjects the extracted image A1 to inversion processing around the symmetry axis 51a, and a reference image A is produced (step S7). The reference image A is stored in the memory 68, and sent from the body microprocessor 12 to the image display controller 15. The image display controller 15 stores the reference image A in the right half of the display region 16a. The aperture value "F8" is displayed above the reference image A. The display state of the reference image A is maintained until the aperture value is determined.

Here, the display position of the reference image A is determined by the body microprocessor 12 on the basis of the positional relationship between the symmetry axis 51a and the reference image A, for example. More specifically, as shown in FIG. 13B, the symmetry axis 51a is disposed on the left side of the reference image A. Therefore, the display position of the reference image A is determined by the body microprocessor 12 to be the right side of the display region 16a so that the symmetry axis 51a will be disposed closer to the comparative image B (discussed below). The display position of the reference image A may instead be determined on the basis of other conditions, such as the positional relationship between the symmetry axis 51a and the reference frame 51, or the positional relationship between the display region 16a and the reference frame 51.

Next, the comparative image B, which is a live image of the subject, is displayed in the left half of the display region 16a (step S8). Since the reference image A is displayed in the right half, this comparative image B corresponds to the left half of the live image of the subject. In other words, an image of the range corresponding to the reference frame 51 in the live image is displayed as the comparative image B. The reference image A and the comparative image B are disposed on either side of the symmetry axis 51a. The reference image and the comparative image B are in contact with each other, and the symmetry axis 51a coincides with the boundary line between the reference image A and the comparative image B. Therefore, if there is no major change in the composition of the subject, substantially the same images of the subject are displayed in linear symmetry around the symmetry axis 51a, as shown in FIG. 13B. Here, the reference image A is a still image captured at an aperture value of F8, whereas the comparative image B is a live image captured at the aperture value set by the aperture ring 40 (in this state, an aperture value of F8). The aperture value set by the aperture ring 40 is displayed above the comparative image B.

Next, it is determined whether or not the depth of field reviewing button 76 has been pressed (step S9). If the depth of field reviewing button 76 has been pressed, a final image C is acquired by the imaging component 45, and this final image C is stored in the image recorder 18 (step S10).

On the other hand, if the depth of field reviewing button 76 has not been pressed, and the aperture ring 40 has been turned by the user, the rotational angle of the aperture ring 40 is detected by the aperture controller 27, and the aperture value set by the aperture ring 40 is detected (steps S11 and S12). The diaphragm drive motor 28b is driven by the aperture controller 27, and the aperture value of the imaging optical system L is adjusted to the aperture value set by the aperture ring 40 (such as F22) (step S13). As a result, as shown in FIG. 13B, a live image of the subject, for which the aperture value is F22, is displayed as the comparative image B on the right half of the liquid crystal monitor 16 (step S13). At this point, the changed aperture value "F22" is displayed above the comparative image B. In this state, the user can compare the reference image A with the comparative image B.

For example, since the aperture value of the reference image A is F8, the reference image A has a shallow subject field depth, in which the background is blurrier than the subject. On the other hand, since the aperture value of the comparative image B is F22, the comparative image B has a deep subject field depth, in which the subject and background are both in focus. Since the reference image A is inverted around the symmetry axis 51*a* of the reference frame 51, two images captured at different aperture values can be compared with their corresponding portions adjacent to one another.

For example, images with aperture values of F8 and F22 can be compared with their backgrounds shown next to each other, which makes it easier to decide which aperture value is preferable. This improves convenience in comparing a plurality of images with this camera system 100.

If the user wishes to display an image with another aperture value as the comparative image B in the display region 16*a*, the aperture ring 40 is adjusted as needed to change the aperture value (step S11). If the aperture value is changed, steps S12 and S13 are repeated, and an image with a different aperture value is displayed as the comparative image B in the display region 16*a*.

When the user finds the desired aperture value, the depth of field reviewing button 76 is pressed and the aperture value determined (step S9). When the depth of field reviewing button 76 is pressed, an image is acquired as the final image C by the imaging component 45, and this final image C is stored in the image recorder 18 (step S10). At this point, as shown in FIG. 13C, the final image C is displayed along with the aperture value in the display region 16*a* of the liquid crystal monitor 16.

3: Effects

The effects obtained with the camera system 100 are as follows.

(1)

With this camera system 100, the reference image A and the comparative image B are displayed side by side, and the reference image A is displayed in an inverted state. The result is that corresponding portions of two images captured under different photography conditions can be compared substantially adjacent to one another, which improves convenience in the comparison of images.

(2)

Also, the reference image A and the comparative image B are displayed side by side with the symmetry axis 51*a* in between, and the boundary line between the reference image A and the comparative image B coincides with the symmetry axis 51*a*. This makes it easier to compare corresponding portions of the reference image A and the comparative image B.

Second Embodiment

Figure 14:
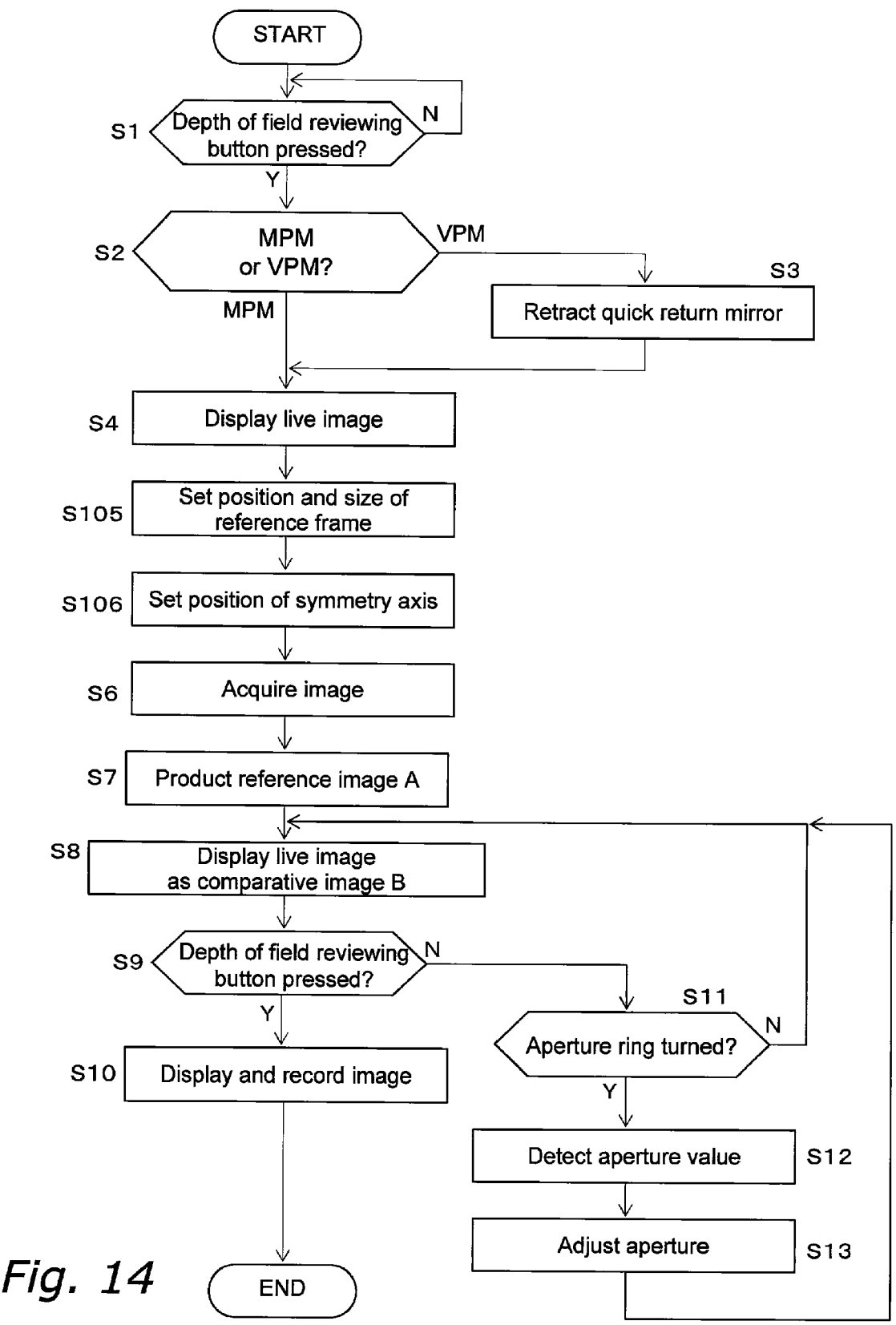
FIG. 14 is a flowchart of the depth of field reviewing mode pertaining to a second embodiment of the present invention.

In the above embodiment, the size and position of the reference frame 51 and the position of the symmetry axis 51*a* were determined by default in the depth of field reviewing mode, but a case in which these elements can be set by the user is also possible. Another embodiment of the depth of field reviewing mode will be described through reference to FIGS. 14 and 15. FIG. 14 is a flowchart of the depth of field reviewing mode pertaining to a second embodiment. FIG. 15A is an example of a live image of the subject displayed on a liquid crystal monitor 16.

Components having substantially the same function as in the above embodiment will be numbered the same and will not be described again.

Here, as opposed to the above embodiment, a reference frame 151 and a symmetry axis 151*a* can be freely selected by the user. More specifically, as shown in FIG. 14, a live image of the subject is displayed on the liquid crystal monitor 16 at the aperture value (such as F8) set by the aperture ring 40 when the mode was changed to the depth of field reviewing mode (step S4). As shown in FIG. 15A, the reference frame 151 for setting the region to be compared is displayed on the liquid crystal monitor 16.

For example, the reference frame 151 is smaller than the above-mentioned reference frame 51, and can be moved up, down, left, or right in the display region 16*a* by operating the directional arrow key 73. Another possible configuration is one that allows the size of the reference frame 151 to be changed with the directional arrow key 73 or another button (not shown). Thus, range information displayed as the reference image A, such as the reference frame 151, can be inputted with the directional arrow key 73 or another such control.

When the position and size of the reference frame 151 are set with the set button 74, the symmetry axis 151*a* is set (steps S105 and S106). More specifically, one of the four sides of the reference frame 151 flashes as a candidate for the symmetry axis 151*a*. The side that flashes as the symmetry axis 151*a* can be changed to another side with the directional arrow key 73. As shown in FIG. 15A, the left side of the reference frame 151 is selected here as the symmetry axis 151*a*. When the set button 74 is pressed, the position of the symmetry axis 151*a* is set, and an image of the subject is acquired by the imaging component 45 (steps S106 and S6). Just as in the above embodiment, the image A11 within the region surrounded by the reference frame 151 is subjected to inversion processing around the symmetry axis 151*a*, producing the reference image A (step S7). As shown in FIG. 15B, the comparative image B is disposed to the left of the symmetry axis 151*a*, and the reference image A is disposed to the right of the symmetry axis 151*a*.

In this case, the position and size of the reference frame 151 and the position of the symmetry axis 151*a* can be determined, so the portion to be compared can be selected more precisely. In FIG. 15C, the final image C is displayed in the display region 16*a* of the liquid crystal monitor 16. This further enhances convenience of comparison.

Other Embodiments

The specific constitution of the present invention is not limited to the embodiments given above, and various modifications and changes are possible without departing from the gist of the invention.

(1)

In the above embodiment, selection and setting of the reference frame were carried out by the user, but the reference frame can be selected by other methods. For instance, the configuration may be such that a region including a large boundary region with a different distance to the subject is detected, and the reference frame is automatically set on the basis of this detection result. More specifically, for example, the Df amount is detected by the focus detection unit 5 at a plurality of points in a single image. On the basis of these Df amounts, the body microprocessor 12 detects the region with the greatest difference in Df amounts within a single image (the greatest difference between focused and unfocused regions). The region with the greatest differential in Df amounts is automatically set as the reference frame.

In this case, since the reference frame is automatically set by the above method, the reference image best suited to comparison can be quickly selected. This further enhances convenience of comparison.

(2)

In the above embodiment, the aperture ring 40 mounted on the interchangeable lens unit 2 was used to update the aperture value. However, the configuration may be such that the aperture value is updated using a dial, button, or other such control mounted on the camera main body 1 instead of using the aperture ring 40. Also, the control mounted on the camera main body 1 need not be one intended [solely] for the purpose of updating the aperture value, and may instead be a control that is also used for some other purpose.

(3)

In the above embodiment, the image displayed on the liquid crystal monitor 16 was acquired by the imaging sensor 11, but it is also possible to use another imaging sensor disposed in the viewfinder optical system. In this case, there is no need to retract the quick return mirror 4 from the optical path X in monitor photography mode. Also, the configuration and disposition of the quick return mirror 4, the viewfinder optical system 19, and so forth are not limited to those discussed above.

(4)

In the above embodiment, when the depth of field reviewing button 76 was pressed once, the mode changed to depth of field reviewing mode, and this depth of field reviewing mode was cancelled when the depth of field reviewing button 76 was pressed again. However, the configuration may be such that the depth of field reviewing mode continues only so long as the depth of field reviewing button 76 is being pressed.

(5)

In the above embodiment, the comparative image B was a live image of the subject, but the comparative image B may instead be a still image just as is the reference image A. For example, when a button (not shown) is pressed in a state in which the comparative image B is displayed as a live image on the liquid crystal monitor 16, the still image at the point when the button was pressed may be displayed as the comparative image B. In this case, since the comparative image B does not move, comparison of the images may be easier with some subjects.

Also, the configuration may be such that in a reproduction mode in which the captured image is reproduced, images captured at different aperture values are displayed side by side to the left and right on the liquid crystal monitor 16. This gives the user a sensory feel for the correlation between the aperture value and the captured images, and can be referred to in subsequent imaging.

(6)

In the above embodiment, an inverted image was displayed as the reference image A, but a case in which an inverted image is displayed as the comparative image B is also possible. The needs of the user can thus be accommodated more broadly.

(7)

In the above embodiment, the aperture value was changed as the photography condition, but the photography condition is not limited to this. For instance, the images that are compared may be a plurality of images captured at different shutter speeds. In this case, in reproduction mode two images are displayed side by side with one image inverted. This makes it easier and more convenient for a plurality of images captured at different shutter speeds to be compared.

A case in which a plurality of continuously captured images is compared is also possible. In this case, continuous imaging is performed while the system switches between various photography modes, such as scenery photography, nighttime photography, or macro photography, in which the photography condition is optimized according the photography situation. These images are displayed side by side, with one inverted, in reproduction mode on the liquid crystal monitor 16. This makes it easier to compare images captured in a variety of modes.

(8)

In the above embodiment, a single-lens reflex camera was used as an example of the camera system 100, but embodiments of the camera system 100 are not limited to this. For example, this camera system 100 can also be applied to a compact camera or the like. In particular, when the camera system 100 is applied to a compact camera having a large imaging element, the position, range, and so forth of the reference frame 51 can be more freely selected, so this camera system 100 is advantageous.

(9)

In the above embodiment, the reference image A and the comparative image B were displayed on the liquid crystal monitor 16 in a state of contact. Also, the boundary line between the reference image A and the comparative image B coincided with the symmetry axis 51*a*. However, a case in which the reference image A and the comparative image B are separated on either side of a symmetry axis is also possible.

Also, the reference image A and the comparative image B were side by side on the left and right, but a case in which the reference image A and the comparative image B are above one another, or diagonally next to each other, is also possible. Here again the effect is the same as in the embodiments given above.

(10)

The two images displayed side by side on the liquid crystal monitor 16 need not be captured at different aperture values, and may instead have the same aperture value.

(11)

The coordinate axes, directions, and so forth used in the above description do not limit the usage state of the present invention.

GENERAL INTERPRETATION OF TERMS

In understanding the scope of the present invention, the term "configured" as used herein to describe a component, section or part of a device includes hardware and/or software that is constructed and/or programmed to carry out the desired function.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member," or "element" when used in the singular can have the dual meaning of a single part or a plurality of parts.

Terms that are expressed as "means-plus function" in the claims should include any structure that can be utilized to carry out the function of that part of the present invention. Finally, terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A camera system, comprising:
    an imaging optical system configured to form an optical image of a subject;
    an imaging component configured to convert the optical image into an image signal and acquiring an image of the subject;
    a display component with which a plurality of the images acquired by the imaging component are arranged to be displayed side by side; and
    a display control component configured to control the display component to display as a reference image at least part of a first image acquired by the imaging component and to display as a comparative image at least part of a second image acquired by the imaging component at a different timing from the first image, the display control component configured to control the display component to display either at least part of the first image or at least part of the second image as either the reference image or the comparative image in a state of being inverted around a specific symmetry axis.

2. The camera system according to claim 1, wherein the display control component determines at least part of the first image and at least part of the second image on the basis of an imaginary reference frame in a display region of the display component when an optical image is converted into an image signal.

3. The camera system according to claim 2, wherein the symmetry axis is part of the reference frame.

4. The camera system according to claim 3, wherein the reference image and comparative image are displayed side by side with the symmetry axis in between.

5. The camera system according to claim 4, wherein the symmetry axis matches a boundary line between the reference image and the comparative image.

6. The camera system according to claim 5, wherein the display control component determines a layout of the reference image and the comparative image on the display component on the basis of the symmetry axis when an optical image is converted into an image signal.

7. The camera system according to claim 6, further comprising:
    a control that allows information to be inputted from the outside,
    wherein when range information related to either the range of the reference image in the first image or the range of the comparative image in the second image is inputted with the control, the display control component is configured to control the display component to display the reference image and the comparative image on the basis of the range information.

8. The camera system according to claim 7, wherein when symmetry axis information related to the position of the symmetry axis in either the reference image or the comparative image is inputted to the control, the display control component is configured to perform inverted display on the display component on the basis of the symmetry axis information.

9. The camera system according to claim 4, further comprising:
    a boundary detector configured to detect a boundary between a focused region and an unfocused region in the first and/or second image,
    wherein the display control component is configured to control the display component to display a boundary periphery detected by the boundary detector as the reference image and comparative image.

10. The camera system according to claim 1, wherein the symmetry axis is part of a reference frame.

11. The camera system according to claim 10, wherein the reference image and comparative image are displayed side by side with the symmetry axis in between.

12. The camera system according to claim 11, wherein the symmetry axis matches a boundary line between the reference image and the comparative image.

13. The camera system according to claim 12, wherein the display control component determines a layout of the reference image and the comparative image on the display component on the basis of the symmetry axis when an optical image is converted into an image signal.

14. The camera system according to claim 13, further comprising:
    a control that allows information to be inputted from the outside,
    wherein when range information related to either the range of the reference image in the first image or the range of the comparative image in the second image is inputted with the control, the display control component is configured to control the display component to display the reference image and the comparative image on the basis of the range information.

15. The camera system according to claim 14, wherein when symmetry axis information related to the position of the symmetry axis in either the reference image or the comparative image is inputted to the control, the display control component is configured to perform inverted display on the display component on the basis of the symmetry axis information.

16. The camera system according to claim 11, further comprising:
    a boundary detector configured to detect a boundary between a focused region and an unfocused region in the first and/or second image,
    wherein the display control component is configured to control the display component to display a boundary periphery detected by the boundary detector as the reference image and comparative image.

17. The camera system according to claim 1, wherein the reference image and comparative image are displayed side by side with the symmetry axis in between.

18. The camera system according to claim 17, wherein the symmetry axis matches a boundary line between the reference image and the comparative image.

19. The camera system according to claim 18, wherein the display control component determines a layout of the reference image and the comparative image on the display component on the basis of the symmetry axis when an optical image is converted into an image signal.

20. The camera system according to claim 19, further comprising:
    a control that allows information to be inputted from the outside,
    wherein when range information related to either the range of the reference image in the first image or the range of the comparative image in the second image is inputted with the control, the display control component is configured to control the display component to display the reference image and the comparative image on the basis of the range information.

* * * * *